United States Patent
Prakash et al.

(10) Patent No.: US 11,354,608 B2
(45) Date of Patent: Jun. 7, 2022

(54) ORGANIZATION ANALYSIS PLATFORM FOR WORKFORCE RECOMMENDATIONS

(71) Applicant: Accenture Global Solutions Limited, Dublin (IE)

(72) Inventors: Ajitesh Prakash, Dublin (IE); Jitesh Goyal, Dublin (IE); Eilís Delany, Dublin (IE); Mykhaylo Zayats, Dublin (IE); John Emmett Mannion, County Roscommon (IE); Yvonne M. Browne, Dublin (IE)

(73) Assignee: Accenture Global Solutions Limited, Dublin (IE)

( * ) Notice: Subject to any disclaimer, the term of this patent is extended or adjusted under 35 U.S.C. 154(b) by 400 days.

(21) Appl. No.: 15/999,019

(22) Filed: Aug. 20, 2018

(65) Prior Publication Data

US 2020/0057976 A1 Feb. 20, 2020

(51) Int. Cl.
*G06Q 10/06* (2012.01)
*G06Q 10/04* (2012.01)

(52) U.S. Cl.
CPC ..... *G06Q 10/063112* (2013.01); *G06Q 10/04* (2013.01); *G06Q 10/0633* (2013.01); *G06Q 10/06393* (2013.01); *G06Q 10/063114* (2013.01)

(58) Field of Classification Search
None
See application file for complete search history.

(56) References Cited

U.S. PATENT DOCUMENTS

| | | | | |
|---|---|---|---|---|
| 8,484,071 B1 * | 7/2013 | Lybrook | ............ | G06Q 10/067 705/7.36 |
| 9,473,730 B1 * | 10/2016 | Roy | ............ | H04H 60/45 |
| 10,360,631 B1 * | 7/2019 | Jezewski | ............ | G06Q 40/06 |
| 2008/0059292 A1 * | 3/2008 | Myers | ............ | G06Q 50/10 705/7.39 |
| 2008/0109257 A1 * | 5/2008 | Albrecht | ............ | G16H 10/20 705/2 |
| 2009/0299802 A1 * | 12/2009 | Brennan | ............ | G06Q 10/0635 705/7.36 |
| 2009/0307052 A1 * | 12/2009 | Mankani | ............ | G06Q 10/06 705/7.17 |
| 2012/0078669 A1 * | 3/2012 | Harkins | ............ | G06Q 10/063 705/7.11 |

(Continued)

FOREIGN PATENT DOCUMENTS

WO  WO-2020053737 A1 * 3/2020 ....... G06Q 10/06315

*Primary Examiner* — Jerry O'Connor
*Assistant Examiner* — Philip N Warner
(74) *Attorney, Agent, or Firm* — Harrity & Harrity, LLP

(57) ABSTRACT

A device may receive organization data defining first capabilities of an organization and industry trend data that is relevant to the organization. The industry trend data may define second capabilities that are relevant to the organization. The device may provide, as input to a capability model, the organization data and the industry trend data. The capability model may have been trained to produce, as output, data specifying recommended changes for the organization. The device may determine, based on the output of the capability model and the industry trend data, a recommendation. The device may perform an action based on the recommendation.

20 Claims, 9 Drawing Sheets

(56) References Cited

U.S. PATENT DOCUMENTS

| | | | |
|---|---|---|---|
| 2012/0253879 A1* | 10/2012 | Santos | G06Q 10/06 |
| | | | 705/7.22 |
| 2013/0006679 A1* | 1/2013 | Ruparelia | G06Q 10/00 |
| | | | 705/7.11 |
| 2014/0229242 A1* | 8/2014 | Dawkes | G06Q 10/0639 |
| | | | 705/7.36 |
| 2014/0337816 A1* | 11/2014 | Chiluvuri | G06F 8/36 |
| | | | 717/107 |
| 2015/0242815 A1* | 8/2015 | Velasco | H04L 67/02 |
| | | | 705/321 |
| 2016/0171425 A1* | 6/2016 | Sanger | G06Q 10/0635 |
| | | | 705/7.17 |
| 2016/0203433 A1* | 7/2016 | Chen | G06Q 10/063112 |
| | | | 705/7.14 |
| 2017/0116552 A1* | 4/2017 | Deodhar | G06Q 10/06316 |
| 2017/0372242 A1* | 12/2017 | Alsubai | G06Q 10/0635 |
| 2018/0157995 A1* | 6/2018 | O'Malley | G06Q 30/00 |
| 2018/0259918 A1* | 9/2018 | Asmus | G05B 15/02 |
| 2019/0053950 A1* | 2/2019 | Muggleton | H04R 1/1083 |
| 2020/0074020 A1* | 3/2020 | Bhagchandani | G06Q 10/087 |

\* cited by examiner

ORGANIZATION ANALYSIS PLATFORM FOR WORKFORCE RECOMMENDATIONS

BACKGROUND

An organization, such as a business, government, non-profit foundation, and/or the like, will often look for ways to improve various aspects of the organization. Improving an organization may, in some situations, involve making changes to the workforce of the organization.

SUMMARY

According to some implementations, a method may comprise: receiving, by a computing resource of a cloud computing environment, organization data, the organization data defining, for an organization, first capabilities of the organization, the first capabilities including: hardware, software, and services capabilities associated with the organization, and skills associated with workers associated with the organization; receiving, by a computing resource of the cloud computing environment, industry trend data that is relevant to the organization, the industry trend data defining second capabilities that are relevant to the organization, the second capabilities including: hardware, software, and services capabilities that are associated with at least one other organization, and skills associated with workers associated with the at least one other organization; receiving, by a computing resource of the cloud computing environment, workforce psychology data for the workers associated with the organization, the workforce psychology data defining characteristics of the workers associated with the organization; providing, by a computing resource of the cloud computing environment and as input to a capability model, the organization data, the industry trend data, and the workforce psychology data, the capability model having been trained to produce, as output, data specifying recommended changes for at least one worker associated with the organization; determining, by a computing resource of the cloud computing environment and based on the output of the capability model and the industry trend data, a recommendation for acquiring at least one of the second capabilities; and performing, by a computing resource of the cloud computing environment and based on the recommendation, an action.

According to some implementations, a device may comprise: one or more memories; and one or more processors, communicatively coupled to the one or more memories, to: receive organization data, the organization data defining, for an organization, first capabilities of the organization, the first capabilities including: hardware, software, and services capabilities associated with the organization, and skills associated with workers associated with the organization; receive industry trend data that is relevant to the organization, the industry trend data defining second capabilities that are relevant to the organization, the second capabilities including: hardware, software, and services capabilities that are associated with at least one other organization, and skills associated with workers associated with at least one other organization; provide, as input to a capability model, the organization data and the industry trend data, the capability model having been trained to produce, as output, data specifying recommended changes for the organization; determine, based on the output of the capability model and the industry trend data, a recommendation for acquiring at least one of the second capabilities; and perform an action based on the recommendation.

According to some implementations, a non-transitory computer-readable medium may store instructions, the instructions comprising: one or more instructions that, when executed by one or more processors, cause the one or more processors to: receive organization data, the organization data defining, for an organization, first capabilities of a first worker associated with the organization, the first capabilities including: hardware, software, and services capabilities associated with the organization, and skills associated with workers associated with the organization; receive industry trend data that is relevant to the organization, the industry trend data defining second capabilities that are relevant to the organization, the second capabilities including: hardware, software, and services capabilities that are associated with at least one other organization, and skills associated with workers associated with at least one other organization; provide, as input to a capability model, the organization data and the industry trend data, the capability model having been trained to produce, as output, data specifying recommended changes for the first worker associated with the organization; determine, based on the output of the capability model, a recommendation for the first worker; and perform an action based on the recommendation for the first worker.

DETAILED DESCRIPTION

Figure 1A:
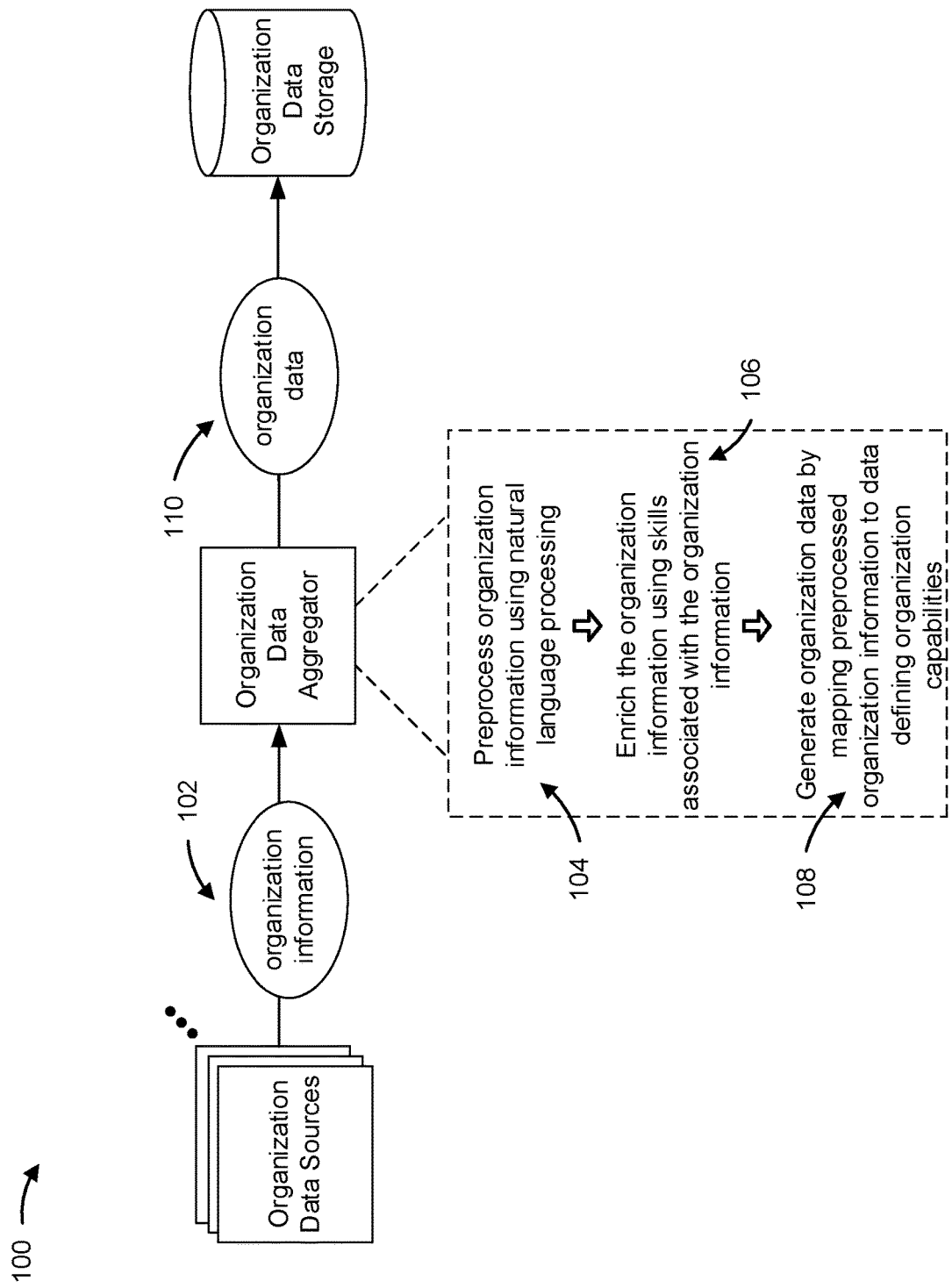
FIGS. 1A-1D are diagrams of example implementations described herein.

The following detailed description of example implementations refers to the accompanying drawings. The same reference numbers in different drawings may identify the same or similar elements.

Organizations often try to improve operations and efficiency by evaluating and taking action to implement changes related to the workforce of the organizations. For example, organizations hire workers (e.g., temporary workers, contractors, full-time workers, and/or the like), release workers, promote workers, demote workers, re-train workers, and/or the like. Organizations also implement new processes and/or new technology in a manner that can affect the organizations' workforces, such as using automation hardware and/or software, outsourcing certain tasks, and/or the like. However, it may often be difficult for an organization to identify which changes should be made that affect the organizations' workforce in a manner designed to improve the organization.

Some implementations, described herein, provide an organization analysis platform that is capable of identifying, for an organization, relevant industry trends that are related to workforce management. The organization analysis platform may use the trends, and information about the organization's current workforce, to determine what changes can or should be made to the organization and/or its workers (e.g., in a manner designed to improve the organization in a variety of ways). For example, the organization analysis platform may receive organization data defining the capabilities of the organization's current workforce, industry trend data identifying workforce related trends in another organization or an industry relevant to the organization, and workforce psychology data indicating, for the workers associated with the organization, the likelihood that the workers would be receptive to changes aligned with the industry trends. Using the foregoing information, and one or more machine learning models, the organization analysis platform may provide one or more recommendations regarding the workforce of the organization. For example, in a situation where industry trends indicate that the organization should acquire a particular capability (e.g., automation of a particular task), the organization analysis platform may determine whether and how the current workforce of the organization can be altered to obtain that capability (e.g., by recommending acquisition of automation software and training a particular worker to use the automation software).

In this way, the organization analysis platform may facilitate the improvement of an organization in a manner designed to utilize the organization's current workforce to the extent possible and recommend changes to the organization's workforce that will align the organization with desired industry trends (e.g., in a manner designed to increase the efficiency and/or improve the operations of the organization). In some implementations, the organization analysis platform may recommend particular changes associated with particular individuals (e.g., recommendations to hire a particular worker, re-train another worker, and/or the like). Workforce recommendations may significantly increase the speed and efficiency of an organization and the organization's workforce transformation, including facilitating more efficient use of information regarding workers associated with the organization. In some implementations, the organization analysis platform may handle thousands, millions, billions, and/or the like, of data records regarding an organization within a period of time (e.g., daily, weekly, monthly), and thus may provide big data capability. The big data handled by the organization analysis platform may be so voluminous and complex that traditional data processing applications cannot be used and/or that the big data cannot be processed objectively by a human actor. Furthermore, some implementations described herein use a rigorous, computerized process to perform tasks or roles that were not previously performed. Also, automating the process for recommending workforce changes conserves computing resources (e.g., processor resources, memory resources, and/or the like) and time that would otherwise be wasted by using manual processes for attempting to identify desired workforce capabilities and determining how to implement workforce changes in a manner designed to achieve the desired workforce capabilities.

FIG. 1A-1D are diagrams of example implementations described herein. As shown in FIG. 1A, example implementation 100 includes organization data sources (e.g., server computers, data storage devices, website servers, and/or the like) that store and/or provide information associated with organizations, an organization data aggregator (e.g., a server computer, a cloud computing platform, and/or the like), and an organization data storage device. While the devices of implementation 100 are depicted separately, in some implementations, the functionality of one or more of the devices of implementation 100 may be included in another device, or may be included in multiple, distributed devices. The example implementation 100 depicts the acquisition of information regarding an organization and the generation and storage of organization data from the organization information.

As shown by reference number 102, the organization data aggregator receives organization information regarding a particular organization from organization data sources. The organization data sources may include a variety of devices associated with a variety of organizations. For example, the particular organization may store information regarding the particular organization (e.g., a human resources database, a worker list, and/or the like). As another example, other organizations may store information regarding the particular organization (e.g., social media websites, job data aggregators, recruiting organizations, and/or the like).

The organization information regarding the particular organization may include a variety of information regarding the capabilities of the particular organization (e.g., hardware capabilities, software capabilities, services capabilities, and/or the like, which are used to perform a variety of actions relevant to an organization), including the capabilities of the workers associated with the organization (e.g., skills associated with workers). In some implementations, organization information may include detailed information regarding the particular organization as well, such as the number of workers, job position of workers, experience of workers, skills associated with workers, and/or other information relevant to determining the capabilities of the particular organization. In some implementations, the organization information received by the organization data aggregator may be received in a variety of formats. For example, organization information may be provided as strings of text, database entries, website objects, and/or the like. While raw organization information may be useful, for use in machine learning algorithms and other applications, some standard manner of representing the organization information may be more useful than the raw organization information.

As shown by reference number 104, the organization data aggregator preprocesses the organization information using natural language processing techniques. The organization data aggregator may preprocess the organization information in a manner designed to ensure that the meaning of the organization information is apparent to the organization data aggregator. For example, preprocessing the organization information may include providing the organization information to a natural language processing model designed to provide, as output for the organization information, data identifying entities, categories, sentiments, labels, and/or the like. Rather than treating text like a mere sequence of symbols, natural language processing considers a hierarchical structure of language (e.g., several words can be treated as a phrase, several phrases can be treated as a sentence, and the words, phrases, and/or sentences convey ideas that can be interpreted). Natural language processing can be applied to analyze text, allowing machines to understand how humans speak, enabling real world applications such as automatic text summarization, sentiment analysis, topic extraction, named entity recognition, parts-of-speech tagging, relationship extraction, stemming, and/or the like. The result of preprocessing is preprocessed organization information that is recognizable to a machine, such as the organization data aggregator.

In some implementations, the organization data aggregator may normalize the organization information. Normalization method may include identifying values or portions of data that are repeated unnecessarily in a file, data structure, and/or the like (e.g., in records or fields, within a table, and/or the like), eliminating such values or portions of data from the file, data structure, and/or the like, converting such values or portions of data from a differing and/or nonstandard format to a same and/or standard format, and/or the like. For example, the data normalization method may include database normalization, such as may be applied to a relational database to organize columns (attributes) and tables (relations) of a relational database to reduce data redundancy and improve data integrity. Database normalization may involve arranging attributes in relations based on dependencies between attributes, ensuring that the dependencies are properly enforced by database integrity constraints. Normalization may be accomplished by applying formal rules either by a process of synthesis (e.g., creating a normalized database design based on a known set of dependencies) or decomposition (e.g., improving an existing (insufficiently normalized) database design based on the known set of dependencies).

In some implementations, the organization data aggregator may cleanse the organization information. Data cleansing may include detecting and correcting (or removing) corrupt or inaccurate data (e.g., records from a record set, table, or database), and then replacing, modifying, or deleting the corrupt or inaccurate data. The data cleansing method may detect and correct inconsistencies originally caused by user entry errors, by corruption in transmission or storage, or by utilization of different definitions for similar data in different data stores. The data cleansing method may include removing typographical errors or validating and correcting values against a known list of entities. In this case, validation may be strict (e.g., rejecting any address that does not have a valid postal code) or fuzzy (e.g., correcting records that partially match existing, known records). The data cleansing method may also include cleaning data by cross checking the data with a validated data set, standardizing the data by changing a reference data set to a new standard (e.g., use of standard codes), and/or the like. Additionally, the data cleansing method may include data enhancement, where data is made more complete by adding related information (e.g., appending an address with any phone number related to that address). The data cleansing method may also involve activities, such as harmonization of data (e.g., harmonization of short codes (e.g., St., Rd., and/or the like) to actual words (e.g., street, road, and/or the like).

As shown by reference number 106, the organization data aggregator may enrich the organization information using skills associated with the organization information. For example, certain entities, categories, labels, and/or the like, which are identified from the organization information and associated with an organization and/or a worker associated with an organization, may also be associated with a predetermined skill or skills. By way of example, a worker associated with an organization may be associated with organization information identifying the worker as a carpenter. Based on this association (e.g., determined from preprocessing the organization information), the organization data aggregator may determine that the worker has skills previously associated with the carpenter profession (e.g., wood-working, construction, home framing, sanding, and/or the like). The skills identified by the organization data aggregator may be used to enrich the organization information, which may enable relatively basic organization information to lead to a wider association of skills for an organization and/or workers associated with the organization.

As shown by reference number 108, the organization data aggregator generates organization data by mapping the preprocessed organization information to data defining organization capabilities. For example, the organization data aggregator may have access to information specifying predetermined organization capabilities (e.g., data defining what an organization and/or worker associated with the organization is/are capable of doing). Preprocessed organization information may be mapped to organization capabilities in a manner designed to identify, for an organization, the capabilities associated with the organization that are identified by the organization information. In some implementations, the mapping of preprocessed organization information to organization capabilities may be performed using one or more machine learning techniques, such as natural language processing techniques designed to categorize the preprocessed organization information into one or more organization capabilities. The organization capabilities identified from the organization information may be stored by the organization data aggregator as organization data.

In some implementations, the organization data aggregator may cluster the organization data. For example, the organization data aggregator may cluster the organization data based on workforce psychology data (e.g., the workforce psychology data described below). In this situation, the organization data aggregator may use a variety of clustering methods (e.g., hierarchical clustering, k-means clustering, distribution model-based clustering, neural model-based cluster, and/or the like) to cluster individuals associated with various capabilities based on the individuals' psychology data (e.g., clustering employees that are likely to be retrained together, clustering employees with leadership abilities together, clustering employees with an aversion to re-training together, and/or the like).

As shown by reference number 110, the organization data aggregator provides organization data to the organization data storage device. The organization data aggregator may provide the organization data (e.g., including data specifying the capabilities of an organization and/or worker(s) associated with the particular organization) to the organization data storage device in a manner designed to make the organization data available for use in determining workforce recommendations for the particular organization. In a situation where the organization data aggregator clusters the organization data, the organization data aggregator may provide clustered organization data to the organization data storage device.

Figure 1B:
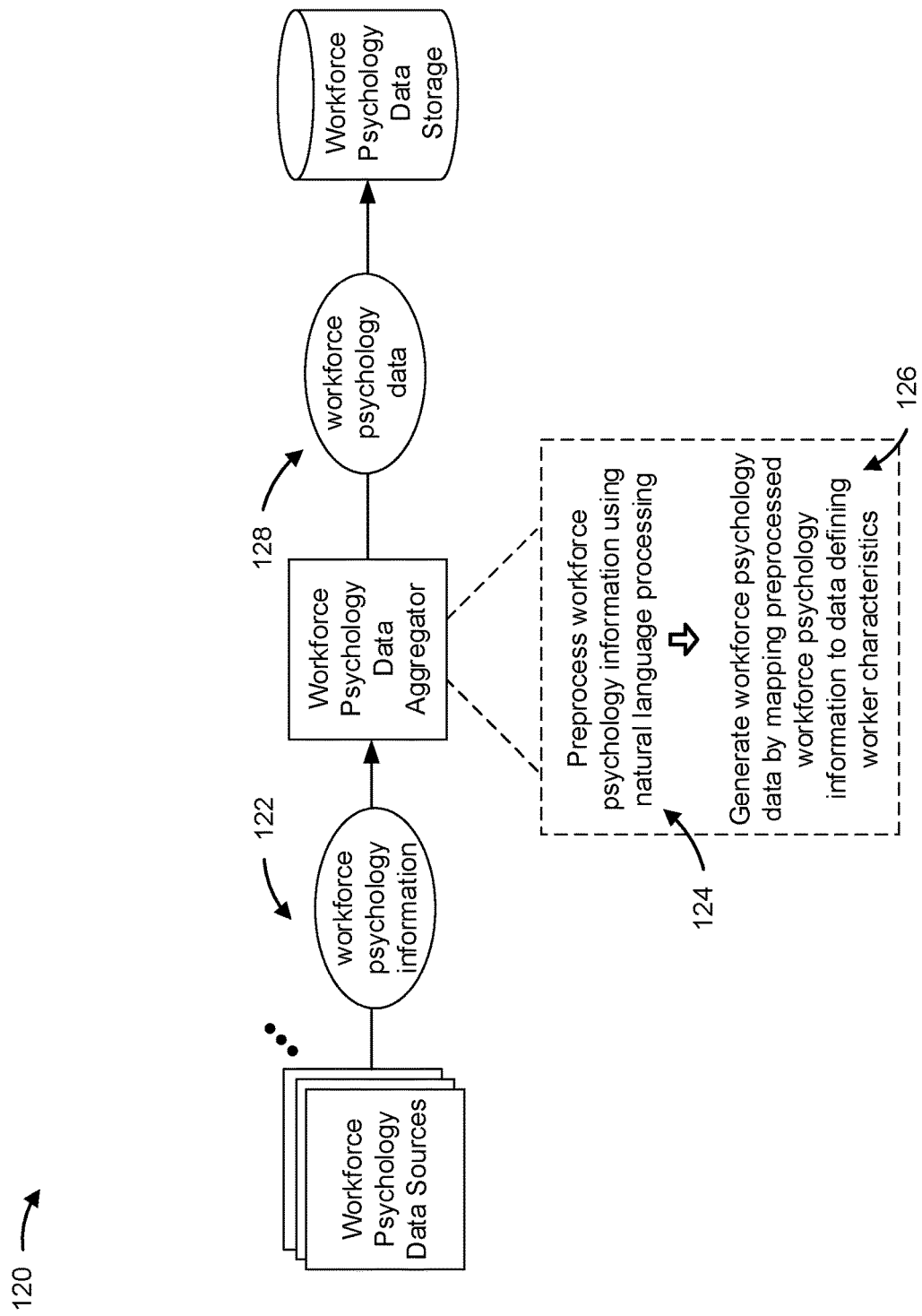

As shown in FIG. 1B, example implementation 120 includes workforce psychology data sources (e.g., server computers, data storage devices, website servers, and/or the like) that store and/or provide information associated with the psychology of a worker or workers, a workforce psychology data aggregator (e.g., a server computer, a cloud computing platform, and/or the like), and a workforce psychology data storage device. While the devices of implementation 120 are depicted separately, in some implementations, the functionality of one or more of the devices of implementation 120 may be included in another device, or may be included in multiple, distributed devices. The example implementation 120 depicts the acquisition of information regarding the psychology of an organization's workforce and the generation and storage of workforce psychology data.

As shown by reference number 122, the workforce psychology data aggregator receives, from workforce psychology data sources, workforce psychology information regarding particular workers associated with the particular organization. Similar to the organization information described above with respect to FIG. 1A, the workforce psychology data sources may include a variety of devices associated with a variety of organizations. For example, the particular organization may store information regarding the psychology of workers associated with the particular organization (e.g., a human resources database, an employee survey database, personality test database, and/or the like). As another example, other organizations may store information regarding the psychology of workers associated with the particular organization (e.g., social media websites, job data aggregators, recruiting organizations, and/or the like).

The workforce psychology information regarding the workers associated with the particular organization may include a variety of information regarding the psychology of the workers, such as a propensity for leadership, attitude towards change, motivations in the workplace, and/or the like. In some implementations, workforce psychology information may include detailed information regarding the particular psychology of a worker, such as job interview questions and answers, worker survey questions and answers, and/or other information relevant to determining psychological information regarding a worker. As with organization information, in some implementations, the workforce psychology information received by the workforce psychology data aggregator may be received in a variety of formats.

As shown by reference number 124, the workforce psychology data aggregator preprocesses the workforce psychology information using natural language processing techniques. The workforce psychology data aggregator may preprocess the workforce psychology information in a manner designed to ensure that the meaning of the workforce psychology information is apparent to the workforce psychology data aggregator. For example, preprocessing the workforce psychology information may include providing the workforce psychology information to a natural language processing model designed to provide, as output for the workforce psychology information, data identifying entities, categories, sentiments, labels, and/or the like. The result of preprocessing is preprocessed workforce psychology information that is recognizable to a machine, such as the workforce psychology data aggregator.

As shown by reference number 126, the workforce psychology data aggregator generates workforce psychology data by mapping the preprocessed workforce psychology information to data defining one or more worker characteristics. For example, the workforce psychology data aggregator may have access to information specifying predetermined worker characteristics (e.g., data defining characteristics of a worker that are relevant to an organization and an organization's capabilities). Preprocessed workforce psychology information may be mapped to worker characteristics in a manner designed to identify, for a worker in the particular organization, the characteristics of the worker that are identified by the workforce psychology information. In some implementations, the mapping of preprocessed workforce psychology information to worker characteristics may be performed using one or more machine learning techniques, such as natural language processing techniques designed to categorize the preprocessed workforce psychology information into one or more worker characteristics. The worker characteristics identified from the workforce psychology information may be stored by the workforce psychology data aggregator as workforce psychology data.

As shown by reference number 128, the workforce psychology data aggregator provides workforce psychology data to the workforce psychology data storage device. The workforce psychology data aggregator may provide the workforce psychology data (e.g., including data specifying the characteristics of worker(s) associated with the particular organization) in the workforce psychology data storage device in a manner designed to make the workforce psychology data available for use in determining workforce recommendations for the particular organization.

Figure 1C:
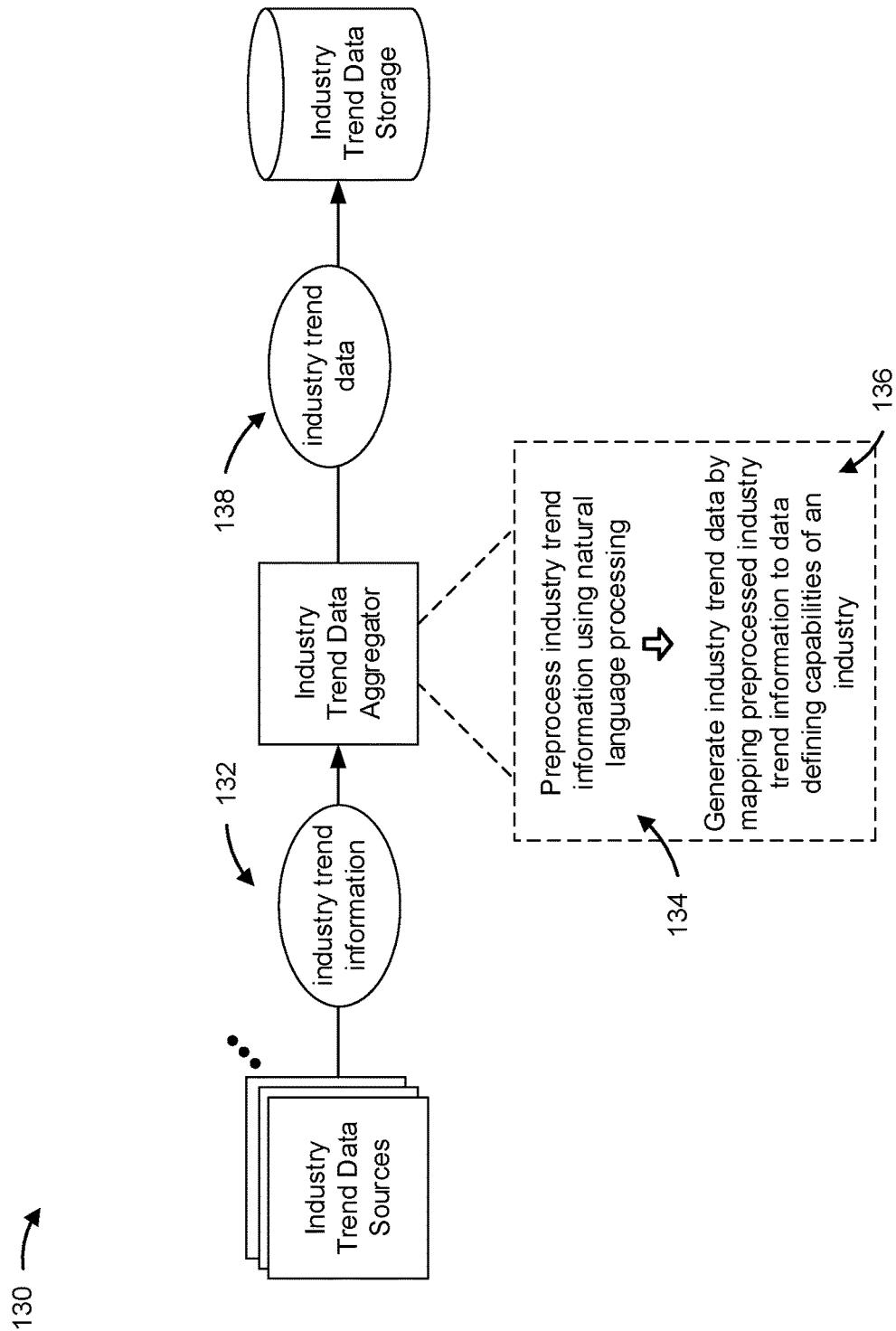

As shown in FIG. 1C, example implementation 130 includes industry trend data sources (e.g., server computers, data storage devices, website servers, and/or the like) that store and/or provide information associated with trends within one or more organizations and/or industries, an industry trend data aggregator (e.g., a server computer, a cloud computing platform, and/or the like), and an industry trend data storage device. While the devices of implementation 130 are depicted separately, in some implementations, the functionality of one or more of the devices of implementation 130 may be included in another device, or may be included in multiple, distributed devices. The example implementation 130 depicts the acquisition of information regarding the industry trends associated with an organization and the generation and storage of industry trend data.

As shown by reference number 132, the industry trend data aggregator receives, from industry trend data sources, industry trend information regarding an industry, organization, and/or organizations associated with the particular organization. Similar to the organization information described above with respect to FIG. 1A, the industry trend data sources may include a variety of devices associated with a variety of organizations. For example, the particular organization may store information regarding industry trends determined to be relevant to the particular organization (e.g., marketing materials, press releases, articles, and/or the like). As another example, other organizations may store information regarding the industry trends associated with the particular organization (e.g., industry websites and publications, news organizations, social media organizations, and/or the like).

The industry trend information regarding the industry trends associated with the particular organization may include a variety of information regarding trending capabilities associated with organizations that are relevant to a particular industry, such as a trend in workforce management, a trend in a particular industry segment towards automation, a trend towards outsourcing workers, a trend towards hiring workers, a trend towards re-training workers, a trend towards releasing workers, a trend towards implementing hardware, software and/or services relevant to an industry, and/or the like. In some implementations, industry trend information may include detailed information regarding particular trends in an industry. By way of example, industry trend information may include data specifying particular software being implemented in an industry segment, the manner in which the software affects workers associated with the organizations that implement the software, and results for an organization (e.g., in terms of efficiency gains, production increases, and/or the like) based on the implementation of the software. As with organization information and workforce psychology information, in some implementations, the industry trend information received by the industry trend data aggregator may be received in a variety of formats.

As shown by reference number 134, the industry trend data aggregator preprocesses the industry trend information using natural language processing techniques. The industry trend data aggregator may preprocess the industry trend information in a manner designed to ensure that the meaning of the industry trend information is apparent to the industry trend data aggregator. For example, preprocessing the industry trend information may include providing the industry trend information to a natural language processing model designed to provide, as output for the industry trend information, data identifying entities, categories, sentiments, labels, and/or the like. The result of preprocessing is preprocessed industry trend information that is recognizable to a machine, such as the industry trend data aggregator.

As shown by reference number 136, the industry trend data aggregator generates industry trend data by mapping the preprocessed industry trend information to data defining organization capabilities. Mapping preprocessed industry trend data to data defining organization capabilities may be performed in a manner similar to that described above for mapping preprocessed organization data to data defining organization capabilities (e.g., as described with respect to FIG. 1A). For example, the industry trend data aggregator may have access to information specifying predetermined organization capabilities (e.g., data defining what an organization and/or worker associated with the organization is/are capable of doing). Preprocessed industry trend information may be mapped to organization capabilities in a manner designed to identify, for an organization, the capabilities that might be provided to the organization and that are identified by the industry trend information. In some implementations, the mapping of preprocessed industry trend information to organization capabilities may be performed using one or more machine learning techniques, such as natural language processing techniques designed to categorize the preprocessed industry trend information into one or more organization capabilities. The organization capabilities identified from the industry trend information may be stored by the industry trend data aggregator as industry trend data.

In some implementations, the industry trend data aggregator may create benchmark data (e.g., industry benchmark data relevant to an industry, organization, and/or the like) by comparing industry trend data received from different sources. For example, benchmark data may include an average of information included in industry trend data, a maximum of information included in industry trend data, or another measure of industry trend data designed to provide a benchmark for comparing an organization to the benchmark data. By way of example, industry trend data from various sources may indicate a ratio of employees that work remotely relative to employees that work from an office. By comparing ratios from various industry trend data sources, the industry trend data aggregator may produce benchmark data that indicates an average ratio of employees that work remotely relative to employees that work from an office. Benchmark data may be stored (e.g., as industry trend data) in the industry trend data storage (e.g., for later use in determining one or more recommendations for an organization).

As shown by reference number 138, the industry trend data aggregator provides industry trend data to the industry trend data storage device. The industry trend data aggregator may provide the industry trend data (e.g., including data specifying the organization capabilities identified from the industry trend information) in the industry trend data storage device in a manner designed to make the industry trend data available for use in determining workforce recommendations for the particular organization.

Figure 1D:
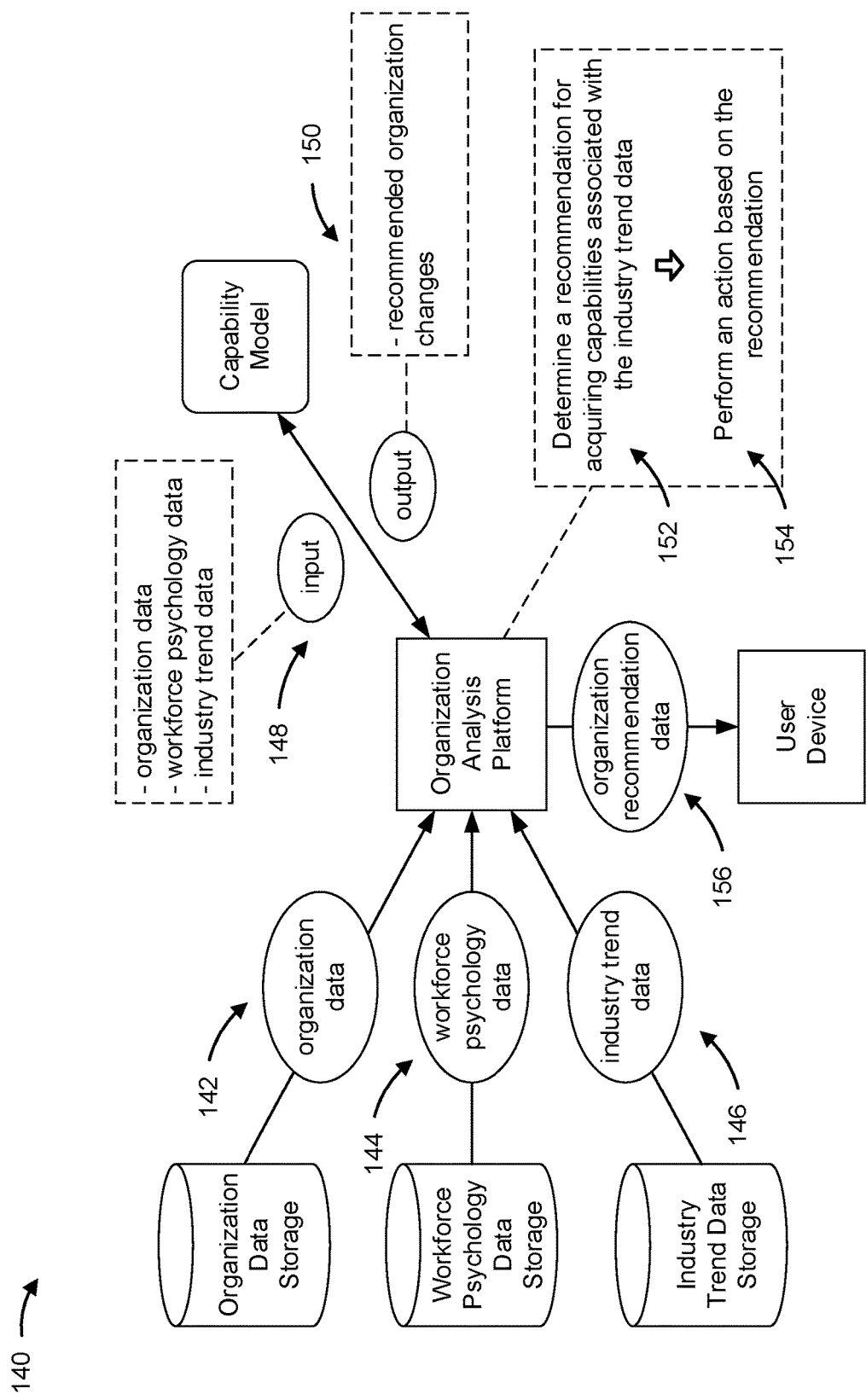

As shown in FIG. 1D, example implementation 140 includes an organization data storage device (e.g., the same as or similar to the organization data storage device described above with reference to FIG. 1A), a workforce psychology data storage device (e.g., the same as or similar to the workforce psychology data storage device described above with reference to FIG. 1B), an industry trend data storage device (e.g., the same as or similar to the industry trend data storage device described above with reference to FIG. 1C), an organization analysis platform (e.g., a server computer, a cloud computing platform, and/or the like), and a user device (e.g., personal computer, tablet computer, mobile device, and/or the like). While the devices of implementation 140 are depicted separately, in some implementations, the functionality of one or more of the devices of implementation 140 may be included in another device, or may be included in multiple, distributed devices. The example implementation 140 depicts the determination of a recommendation for an organization and performing an action based on the recommendation.

As shown by reference number 142, the organization analysis platform receives organization data from the organization data storage device. As noted above, the organization data storage device may be a data storage device associated with an organization (e.g., a human resources database, a worker list, and/or the like) or a third party that stores information regarding workers associated with the organization (e.g., a job website, social media website, contractor website, worker data provider, and/or the like). The organization data includes a variety of information regarding the capabilities of the organization (e.g., hardware capabilities, software capabilities, services capabilities, and/or the like, which are used to perform a variety of actions relevant to an organization), including the capabilities of the workers associated with the organization (e.g., skills associated with workers).

By way of example, the organization analysis platform may obtain organization data for a manufacturing organization that manufactures products. The organization data may specify, for the manufacturing organization, and workers associated with the manufacturing organization, a variety of capabilities. The manufacturing organization may be associated with the capability to manufacture three different types of products, the capability to operate assembly line hardware to manufacture products, the capability to manage a manufacturing organization, and/or the like. The workers associated with the manufacturing organization may be associated with the capability to operate the hardware necessary to produce the three different types of products, the capability to manage people, the capability to manage a manufacturing organization, the capability to provide assistant services within the manufacturing organization, the capability to market the products of the manufacturing organization, and/or the like. The capabilities associated with workers may be specific to individual workers. For example, an individual worker associated with the manufacturing organization, such as an assembly line employee, may be associated with the capability of manufacturing one of the three products produced by the manufacturing organization, while an executive assistant may be associated with various assistant-related capabilities (e.g., management of calendar software, handling telephone calls, organizing meetings, and/or the like).

In some implementations, the organization data may have been previously formatted (e.g., by the organization data aggregator described above with reference to FIG. 1A) for use by the organization analysis platform. In some implementations, the organization analysis platform may format the organization data. The organization data may be formatted into a predetermined format, which the organization analysis platform may use to perform a variety of analysis techniques. For example, organization data received from various sources may be provided in various formats. The organization analysis platform may use a predetermined format designed to convert text received from an organization data storage device, into particular strings of text that are standardized, within the organization analysis platform, for use with a variety of machine learning models or other types of analysis. For example, natural language processing may be used to derive meaning from organization data received by the organization analysis platform, and the derived meanings may be associated with, or categorized as specifying, one or more predetermined capabilities.

In this way, the organization analysis platform may receive organization data that may be used to determine the capabilities of the organization and the capabilities of the workers associated with the organization. The capabilities of the organization and the workers associated with the organization may, as described in further detail below, enable the organization analysis platform to determine one or more recommendations for the workforce associated with the organization.

As shown by reference number 144, the organization analysis platform receives workforce psychology data from the workforce psychology data storage device. As with the organization data storage device, the workforce psychology data storage device may be associated with the organization (e.g., a human resources database, a worker survey database, and/or the like) or a third party that stores information relevant to worker psychology. The workforce psychology data includes a variety of information indicating worker characteristics associated with workers associated with the organization. For example, the workforce psychology data may indicate, for workers associated with the organization, characteristics that are relevant to the organization and the organization's capabilities.

By way of example, the organization analysis platform may obtain workforce psychology data for the workers associated with the example manufacturing organization described above. The workforce psychology data may indicate, for one worker, that the worker has a propensity for leadership, embraces change, and is willing to retrain. For another worker, the workforce psychology data may indicate that the other work has a propensity for leadership, but is resistant to change and is not willing to retrain. In some implementations, the workforce psychology data includes, for each characteristic associated with a worker, a measure of confidence that the model that produced the characteristic has that the characteristic is accurately applied to the worker. The worker characteristics, and any associated measures of confidence, may be used to determine one or more recommendations regarding the workforce of the manufacturing organization.

In some implementations, the workforce psychology data may have been previously formatted (e.g., by the workforce psychology data aggregator described above with reference to FIG. 1B) for use by the organization analysis platform. In some implementations, the organization analysis platform may format the workforce psychology data. The workforce psychology data may be formatted into a predetermined format, which the organization analysis platform may use to perform a variety of analysis techniques. For example, workforce psychology data received from various sources may be provided in various formats. The organization analysis platform may use a predetermined format designed to convert text received from a workforce psychology data storage device, into particular strings of text that are standardized, within the organization analysis platform, for use with a variety of machine learning models or other types of analysis. For example, natural language processing may be used to derive meaning from workforce psychology data received by the organization analysis platform, and the derived meanings may be associated with, or categorized as specifying, one or more predetermined worker characteristics.

In this way, the organization analysis platform may receive workforce psychology data that may be used to determine the characteristics of workers associated with the organization. Receiving the workforce psychology data may, as described in further detail below, enable the organization analysis platform to determine one or more recommendations for the workforce associated with the organization.

As shown by reference number 146, the organization analysis platform receives industry trend data from the industry trend data storage device. As noted above, the industry trend data storage device may be a data storage device associated with the organization or a third party that stores information regarding industry trends that are relevant to the organization. The industry trend data includes a variety of information regarding capabilities associated with organizations and/or the industry relevant to the organization, such as hardware capabilities, software capabilities, services capabilities, and/or the like, which are used by other organizations perform a variety of actions, including the capabilities of the workers associated with the other organizations (e.g., skills associated with workers). In some implementations, the industry trend data may include benchmark data derived from multiple industry trend data sources. In some implementations, the organization analysis platform may generate the benchmark data from the industry trend data (e.g., in a manner similar to that described above with reference to the industry trend data aggregator).

By way of example, the organization analysis platform may obtain industry trend data for the workers associated with the example manufacturing organization described above. The industry trend data relevant to the manufacturing organization may indicate a variety of capabilities associated with the manufacturing industry, and/or for a particular manufacturer or set of manufacturing organizations (e.g., competitors of the manufacturing organization). For example, the industry trend data may indicate that manufacturing organizations are trending towards implementing hardware and software to automate the assembly line work for two of the three products produced by the manufacturing organization, virtual assistants are replacing executive assistants, human resources departments are being outsourced, and that marketing professionals are being hired to obviate the use of outside marketing firms.

In some implementations, the industry trend data includes, for each of the capabilities associated with the industry trends, a measure of confidence that the capability is relevant to the manufacturing organization. For example, the industry trend data may indicate a very high measure of confidence that the capability to implement the hardware and software to automate assembly line work for two of the products produced by the manufacturer is relevant to the manufacturing organization, a high measure of confidence that the capability to use virtual assistants is relevant to the manufacturing organization, a moderate measure of confidence that the capability to outsource the human resources department is relevant to the manufacturing organization, and a moderate measure of confidence that the capability to do in-house marketing is relevant to the manufacturing organization. The measures of confidence may be produce by one or more machine learning models (e.g., a model used by the industry trend data aggregator, as described above with reference to FIG. 1C, or a model used by the organization analysis platform to determine the relevance of capabilities to the manufacturing organization).

By way of example, the machine learning model used by the organization analysis platform may include one or more of a lasso regression model, a random forest model, a support vector machine model, an artificial neural network model, a data mining model, a frequent rule mining model, a pattern discovery model, and/or the like. In some implementations, the organization analysis platform may utilize one or more trained machine learning models, and may utilize the best results determined by one of the machine learning models. In some implementations, the organization analysis platform may utilize multiple machine learning models, and may aggregate the results determined by the multiple machine learning models.

In some implementations, the industry trend data may include information designed to enable ranking the capabilities associated with the industry trends. The ranking may be used to determine which capabilities are most likely to be beneficial to implement by the organization. For example, automation of assembly line work may be identified as highly beneficial, while the use of in-house marketing professionals may be identified as moderately beneficial. The ranking of capabilities associated with industry trends may be performed by machine learning (e.g., by the industry trend data aggregator, as described above with reference to FIG. 1C, or by the organization analysis platform).

When using machine learning, a machine learning model may be trained to receive, as input, a variety of features associated with the industry trend data. A feature may be a measurable property or characteristic that may be used for training a machine learning model, such as a property relating to a particular individual or demographic of individuals, a property associated with aggregating a particular type of information, a property identifying a benchmark for a particular individual or class of individuals, a property capable of being used as a signal of interest for a particular good or service, and/or the like. In some cases, a feature may relate to a browsing behavior, an affinity, an interest, a life event, a keyword, a URL, a viewed webpage, a clicked or selected button, a type of content, a device used at a particular time period, and/or the like. Machine learning features may be determined using a feature identification technique, such as text mining and latent semantic analysis (LSA), a trend variable analysis, an interest diversity analysis, a neural network, a composite indicators analysis, a clustering analysis, and/or the like. Using one or more feature selection techniques, the organization analysis platform may select the features to be used by a machine learning model. The resulting model may receive features (e.g., organization data and/or workforce psychology data) as input and produce, as output, data indicating a measure of likelihood that a particular capability is relevant to an organization.

In some implementations, and as with the organization data and workforce psychology data, the industry trend data may have been previously formatted (e.g., by the industry trend data aggregator described above with reference to FIG. 1C) for use by the organization analysis platform. In some implementations, the organization analysis platform may format the industry trend data. The industry trend data may be formatted into a predetermined format, which the organization analysis platform may use to perform a variety of analysis techniques. For example, industry trend data received from various sources may be provided in various formats. The organization analysis platform may use a predetermined format designed to convert text received from an industry trend data storage device into particular strings of text that are standardized, within the organization analysis platform, for use with a variety of machine learning models or other types of analysis. For example, natural language processing may be used to derive meaning from industry trend data received by the organization analysis platform, and the derived meanings may be associated with, or categorized as specifying, one or more predetermined capabilities.

In this way, the organization analysis platform may receive industry trend data that may be used to determine the capabilities of another organization, other organizations, and/or an industry relevant to the organization. The capabilities determined from the industry trend data may, as described in further detail below, enable the organization analysis platform to determine one or more recommendations for the workforce associated with the organization.

As shown by reference number 148, the organization analysis platform provides a capability model with input including the organization data, the workforce psychology data, and the industry trend data. In some implementations, any of the three types of data (e.g., the organization data, the workforce psychology data, and the industry trend data), or another type of data, may be provided as input to the capability model. In some implementations, the organization analysis platform provides clustered organization data to the capability model (e.g., in a situation where the organization data is clustered by the organization data aggregator and/or the organization analysis platform. In some implementations, the industry trend data provided to the capability may include benchmark data (e.g., benchmark data generated by the industry trend data aggregator and/or the organization analysis platform). The capability model has been previously trained to produce, as output, data specifying recommended changes for the organization, such as a recommended change associated with the capabilities of the organization and/or a recommended change associated with the capabilities of at least one worker associated with the organization.

In some implementations, the capability model has been previously trained using one or more supervised machine learning techniques. Training data may be obtained from previous applications of the capability model that are annotated by a user with data indicating whether the output of the capability model correctly identified recommendations that were relevant to an organization. Using supervised machine learning, the capability model may be trained to produce, as output, at least one recommendation for an organization (e.g., the recommendation indicating a change to be made, and in some implementations, a measure of confidence in the output).

In some implementations, the organization analysis platform may train the capability model using one or more subsets of features (e.g., features identified and selected based on feature identification and selection techniques described above). Additionally, the organization analysis platform may train the capability model using a supervised training technique, an unsupervised training technique, a classification-based training technique, a logistical regression-based training technique, a Naïve Bayesian classifier technique, a support vector machine (SVM) training technique, a neural network, and/or the like. In this case, the capability model may be trained to output values indicating a measure of confidence that a recommendation is relevant to the organization.

In some implementations, the organization analysis platform may receive the capability model after the capability model has been trained. For example, a device other than the organization analysis platform may train the capability model and may provide the capability model to the organization analysis platform. In some cases, the device other than the organization analysis platform may train a portion of the capability model, and the organization analysis platform may train the remainder of the capability model.

As shown by reference number 150, the organization analysis platform receives, as output from the capability model, data specifying at least one recommended change for the organization. In some implementations, the capability model may be trained to produce, as output, data indicating one or more capabilities, and each capability may be associated with a measure of confidence that the capability is beneficial to the organization. Whether a capability is beneficial to the organization may depend on a variety of factors, such as the efficiency and/or productivity impact associated with implementing a capability, the ease with which the capability may be obtained by the organization, and/or the like. As described above, the recommendation for a capability, including whether and to what extent a capability is beneficial to an organization, may be provided as output from the capability model.

In some implementations, non-machine learning based approaches may be used by the organization analysis platform to determine recommended changes for an organization. For example, the organization analysis platform may identify, as recommended changes, at least one of the capabilities that are identified by the industry trend data but are not included in the capabilities identified by the organization data. In this situation, information specifying how relevant a capability is to an organization may be combined with information specifying how important the capability is to the organization, to produce a recommended change to acquire the capability.

Using the example manufacturing organization example, the capability model may be used to determine recommended changes to the manufacturing organization. For example, the recommended changes may be to acquire the capability to automate the assembly line work for two products produced by the manufacturing organization, to implement virtual assistant capability for executives, to outsource human resources operations to a human resources service provider, and to gain in-house marketing capabilities. As noted above, each of the foregoing recommendations may be associated with a measure of importance, or score, indicating how important the recommended change is to the organization.

In this way, the organization analysis platform may identify recommended changes (e.g., capabilities to acquire) for an organization. By identifying recommended changes, the organization analysis platform may determine how an organization should acquire the recommended capabilities.

As shown by reference number 152, the organization analysis platform determines a recommendation for acquiring capabilities associated with the industry trend data. The capabilities associated with the industry trend data may include, for example, the capabilities identified by (and produced as output by) the capability model. In some implementations, the potential recommendations for acquiring a capability are predetermined based on the capability. For example, one capability may be acquired only by hiring or re-training a worker; another capability may be acquired by purchasing software, developing software, outsourcing development of software, hiring a worker to develop software, or re-training a worker to develop software. The organization analysis platform determines the recommendation for acquiring the capability (e.g., implementing the change to the organization) from the predetermined potential recommendations in a variety of ways.

In some implementations, the organization analysis platform may use one or more machine learning techniques to determine the manner in which a capability should be acquired for an organization. For example, a ranking model may be used to determine which method an organization should use to acquire a particular capability, given the current capabilities of the organization, the capabilities of the workforce of the organization, the workforce psychology data associated with the organization. The ranking model may be trained using one or more supervised machine learning techniques, based on previous recommendations associated with a variety of capabilities and organizations. For example, to acquire the capability to implement virtual assistants, an organization may need to purchase virtual assistant software, virtual assistant services, or a combination of both; to either hire or re-train a worker (e.g., determined based on workforce psychology data) to manage the virtual assistants; and to release or re-train former assistants being replaced by the virtual assistants. For one organization, the recommendation may be to use software virtual assistants over virtual assistant services (e.g., based on software virtual assistant services being more beneficial than virtual assistant services for larger organizations); to hire a worker rather than re-train a worker (e.g., based on the availability of a potential new hire and the lack of re-trainability of current workers for the virtual assistant management role); and to re-train the former assistants rather than release the former assistants, or a combination thereof (e.g., based on costs associated with releasing workers, available re-training opportunities, re-trainability of the workers, and/or the like). For another organization, the recommended manner in which the other organization should acquire the virtual assistant capability may differ, and in both situations, acquiring the virtual assistant capability may be beneficial to the organization.

For the example manufacturing organization, the recommendations to acquire various capabilities may be to automate the assembly line work for two products produced by the manufacturing organization by buying hardware and software used to automate the assembly line work, to re-train at least one assembly line worker (e.g., identified as likely to be re-trainable by workforce psychology data) to manage the assembly line automation process, to release at least one assembly line worker (e.g., identified as unlikely to be re-trainable by workforce psychology data) associated with production of the two products, to replace at least one executive assistant with one or more virtual assistants, to hire new marketing professionals to perform in-house marketing, to re-train at least one executive assistant (e.g., identified as likely to be re-trainable by workforce psychology data) to become a marketing assistant, to outsource human resources operations to a particular human resources service provider, and to release human resources workers (e.g., identified as unlikely to be re-trainable by workforce psychology data).

In this way, the organization analysis platform may determine a recommendation for acquiring capabilities associated with the industry trend data. Using the recommendation, the organization analysis platform may perform a variety of actions designed to facilitate the acquisition of the recommended capabilities in the recommended manner.

As shown by reference number 154, the organization analysis platform performs an action based on the recommendation. As noted above, the organization analysis platform may perform a variety of actions designed to facilitate acquisition of the recommended capability or capabilities for an organization. In some implementations, the action taken may depend upon the recommendation, the capability (or capabilities), predetermined settings or instructions provided by the organization, and/or the like.

In some implementations, and as shown by reference number 156, the organization analysis platform may provide organization recommendation data to the user device. For example, the user device may be associated with an individual or other entity capable of making decisions regarding or otherwise acting on recommendations. The organization recommendation data may include, for example, a recommendation to hire a worker, hire a contractor, release a worker, re-train a worker, interview a worker, purchase new hardware, develop new hardware, purchase new software, develop new software, purchase new services, implement new services in-house, schedule a meeting regarding a recommendation, and/or the like. In some implementations, the organization analysis platform may schedule a meeting for various individuals associated with the organization to discuss the organization recommendation data. In some implementations, the organization recommendation data may include information designed to notify an individual or other entity that the organization analysis platform has taken or is about to take action based on the recommendation(s), such as any of the actions described below.

In some implementations, the organization analysis platform may identify a target worker (e.g., a new worker to hire) based on information available on a website or other source of information identifying potential workers to hire. For example, the target worker may be identified by determining whether information regarding the target worker (e.g., obtained from a profile, resume, and/or the like) indicates that the target worker has the capability or capabilities the organization has been recommended to acquire. In some implementations, multiple target workers may be identified and ranked (e.g., based on how closely the information regarding the target worker matches the recommended capability or capabilities). In some implementations, information regarding the target worker(s) may be provided to the user device (e.g., in a manner designed to enable an individual to determine whether to pursue interviewing and/or hiring the target worker(s). In some implementations, the organization analysis platform may automatically schedule an interview and/or screening call with a target worker and/or automatically contact the target worker (e.g., using a virtual assistant, via e-mail, and/or the like) to determine whether the target worker is interested in the organization. For example, a virtual assistant may be provided with data identifying the capabilities the organization has been recommended to acquire, and the virtual assistant may automatically call the target worker to conduct an interview and determine whether the target worker has the capabilities the organization has been recommended to acquire.

In some implementations, the organization analysis platform may identify a contractor associated with the recommendation. For example, one or more contractor web sites or other sources of information may be searched to identify the one or more contractors capable of providing the capability associated with the recommendation. The organization analysis platform may perform a variety of actions after identifying a contractor, such as any of the actions described above as being performed for a target worker (e.g., providing information regarding the contractor(s) to the user device, contacting the contractor(s), setting up a meeting with the contractor(s), and/or the like).

In some implementations, the organization analysis platform may identify new hardware, software, and/or services to be obtained based on the recommendation and order the new hardware, software, and/or services. For example, in a situation where new software is recommended, the organization analysis platform may order the new software for the organization and provide the user device with data indicating that the new software has been ordered. Additionally, or alternatively, the organization analysis platform may cause installation of hardware and/or software, and/or installation of services, after ordering the new hardware, software, and/or services.

In some implementations, the organization analysis platform may generate a job profile for a worker to be hired based on the recommendation. For example, the organization analysis platform may create a job posting, or profile, identifying the capability or capabilities desired in a new worker to be hired, and provide that job posting or profile to a recruiting organization, job posting website, and/or the like, for making the job profile or posting publicly available. The organization analysis platform may automatically handle responses to a job profile or posting (e.g., in a manner similar to handling the identification of a target worker). In some implementations, the job profile or job posting may be provided to the user device, enabling an individual associated with the user device to review the job profile or posting prior to having the job profile or posting made publicly available.

In some implementations, the organization analysis platform may identify, for a worker associated with a recommendation, contact information associated with the worker (e.g., phone number, e-mail address, and/or the like). Using the contact information, the organization analysis platform may communicate with the worker regarding re-training. For example, the organization analysis platform may automatically sign the worker up for re-training courses, notify the worker regarding re-training, and/or the like.

In some implementations, the organization analysis platform may identify, for a worker associated with a recommendation, contact information associated with a manager of the worker. The organization analysis platform may then provide the manager of the worker with data indicating a recommended action, such as data indicating the worker should be re-trained or released.

In some implementations, recommendations regarding a worker, and the action taken regarding the worker, may be based on workforce psychology data associated with the worker. For example, the workforce psychology data may indicate a measure of likelihood that the worker can be re-trained for a particular capability recommended for the organization. In some situations, the organization may specify a threshold measure of likelihood that the worker can be re-trained to determine the action to be taken regarding the worker. For example, in a situation where the worker does not meet the threshold measure of likelihood for re-training, the worker may be released; in a situation where the worker does meet the threshold measure of likelihood for re-training, the worker may be recommended for re-training.

In this way, the organization analysis platform may facilitate the improvement of an organization in a manner designed to utilize the organization's current workforce to the extent possible and recommend changes to the organization's workforce that will align the organization with desired industry trends (e.g., in a manner designed to increase the efficiency and/or improve the operations of the organization). In some implementations, the organization analysis platform may recommend particular changes associated with particular individuals (e.g., recommendations to hire a particular worker, re-train another worker, and/or the like). Workforce recommendations may significantly increase the speed and efficiency of an organization and the organization's workforce transformation, including facilitating more efficient use of information regarding workers associated with the organization. Furthermore, some implementations described herein use a rigorous, computerized process to perform tasks or roles that were not previously performed. Also, automating the process for recommending workforce changes conserves computing resources (e.g., processor resources, memory resources, and/or the like) and time that would otherwise be wasted by using manual processes for attempting to identify desired workforce capabilities and determining how to implement workforce changes in a manner designed to achieve the desired workforce capabilities.

As indicated above, FIGS. 1A-1D are provided merely as examples. Other examples are possible and may differ from what was described with regard to FIGS. 1A-1D.

Figure 2:
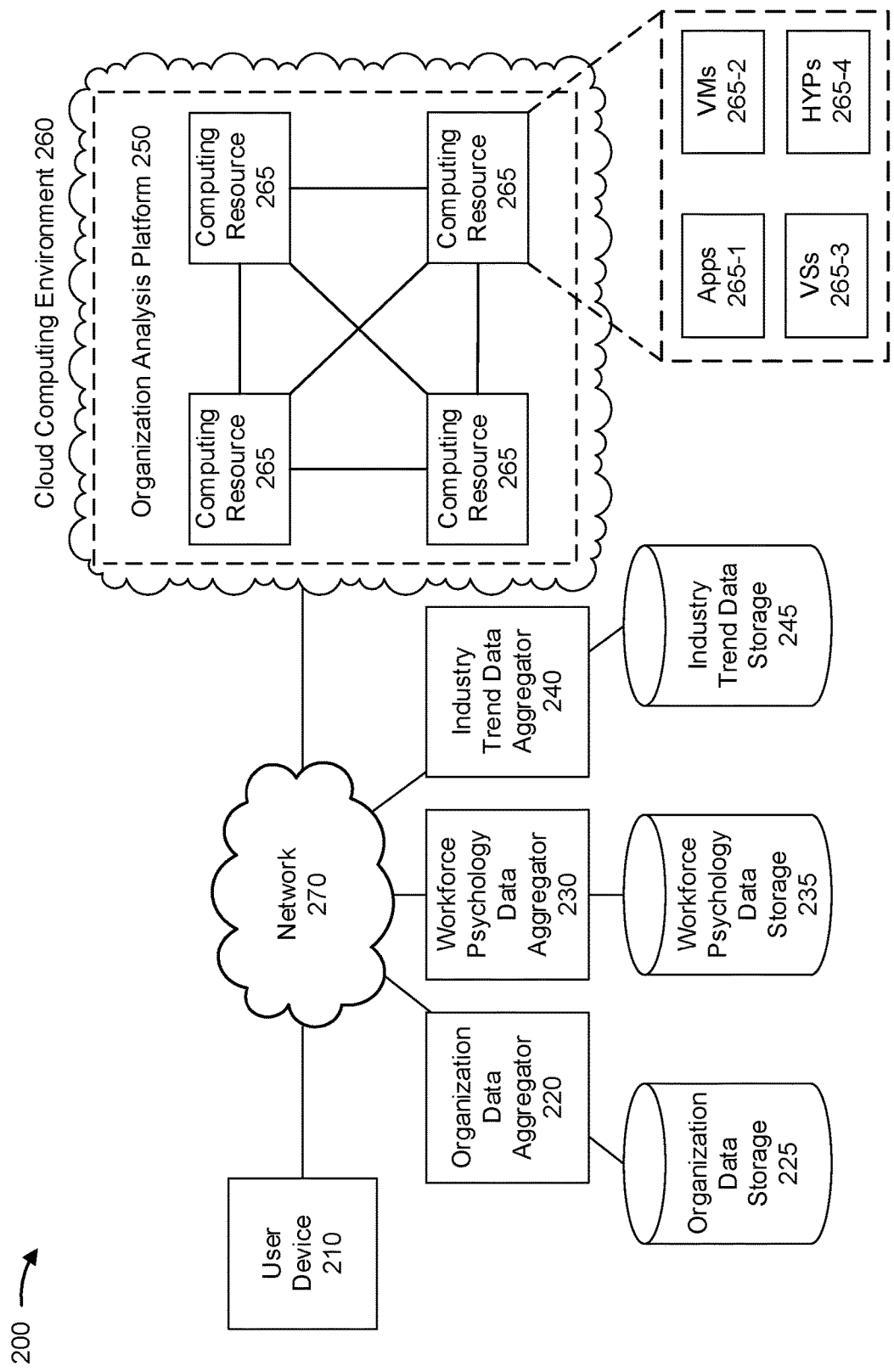
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a user device 210, an organization data aggregator 220, an organization data storage device 225, a workforce psychology data aggregator 230, a workforce psychology data storage device 235, an industry trend data aggregator 240, an industry trend data storage device 245, an organization analysis platform 250, a cloud computing environment 260, a computing resource 265, and a network 270. Devices of environment 200 may interconnect via wired connections, wireless connections, or a combination of wired and wireless connections.

User device 210 includes one or more devices capable of receiving, generating, storing, processing, and/or providing information associated with workforce data and recommendations. For example, user device 210 may include a communication and/or computing device, such as a mobile phone (e.g., a smart phone, a radiotelephone, etc.), a laptop computer, a tablet computer, a handheld computer, a gaming device, a wearable communication device (e.g., a smart wristwatch, a pair of smart eyeglasses, etc.), or a similar type of device. User device 210 may be capable of communicating with organization analysis platform 250 to receive data regarding workforce recommendations associated with an organization.

Organization data aggregator 220 includes one or more devices capable of receiving, generating, storing, processing, and/or providing information associated with organization data. For example, organization data aggregator 220 may include a server device (e.g., a host server, a web server, an application server, etc.), a data center device, or a similar device. For example, organization data aggregator 220 may be capable of obtaining information related to an organization or organizations from a variety of sources, aggregating the obtained information, and formatting the organization information into organization data usable by organization analysis platform 250. While depicted separately from organization analysis platform 250, in some implementations, the functionality of organization data aggregator 220 may be included in organization analysis platform 250. Organization data aggregator 220 is depicted in communication with organization data storage device 225, which includes one or more devices capable of receiving, storing and/or providing information regarding organization data. For example, organization data storage device 225 may include one or more hard drives, random access memory (RAM), distributed storage devices, and/or the like.

Workforce psychology data aggregator 230 includes one or more devices capable of receiving, generating, storing, processing, and/or providing information associated with workforce psychology data. For example, workforce psychology data aggregator 230 may include a server device (e.g., a host server, a web server, an application server, etc.), a data center device, or a similar device. For example, workforce psychology data aggregator 230 may be capable of obtaining information related to the workforce of an organization from a variety of sources, aggregating the obtained information, and formatting the workforce psychology information into workforce psychology data usable by organization analysis platform 250. While depicted separately from organization analysis platform 250, in some implementations, the functionality of workforce psychology data aggregator 230 may be included in organization analysis platform 250. Workforce psychology data aggregator 230 is depicted in communication with workforce psychology data storage device 235, which includes one or more devices capable of receiving, storing and/or providing information regarding workforce psychology data. For example, workforce psychology data storage device 235 may include one or more hard drives, random access memory (RAM), distributed storage devices, and/or the like.

Industry trend data aggregator 240 includes one or more devices capable of receiving, generating, storing, processing, and/or providing information associated with industry trend data. For example, industry trend data aggregator 240 may include a server device (e.g., a host server, a web server, an application server, etc.), a data center device, or a similar device. For example, industry trend data aggregator 240 may be capable of obtaining information related to one or more organizations or industries from a variety of sources, aggregating the obtained information, and formatting the industry trend information into industry trend data usable by organization analysis platform 250. While depicted separately from organization analysis platform 250, in some implementations, the functionality of industry trend data aggregator 240 may be included in organization analysis platform 250. Industry trend data aggregator 240 is depicted in communication with industry trend data storage device 245, which includes one or more devices capable of receiving, storing and/or providing information regarding industry trend data. For example, industry trend data storage device 245 may include one or more hard drives, random access memory (RAM), distributed storage devices, and/or the like.

Organization analysis platform 250 includes one or more devices capable of receiving, generating, storing, processing, and/or providing information associated with the capabilities and workforce of an organization. For example, organization analysis platform 250 may include a server device (e.g., a host server, a web server, an application server, etc.), a data center device, or a similar device. For example, organization analysis platform 250 may be capable of determining recommendations for an organization based on information regarding the organization's workforce and capabilities, and performing a variety of actions based on the recommendations, including communicating with user device 210 regarding the recommendations.

In some implementations, as shown, organization analysis platform 250 may be hosted in cloud computing environment 260. Notably, while implementations described herein describe organization analysis platform 250 as being hosted in cloud computing environment 260, in some implementations, organization analysis platform 250 might not be cloud-based (i.e., may be implemented outside of a cloud computing environment 260) or might be partially cloud-based.

Cloud computing environment 260 includes an environment that delivers computing as a service, whereby shared resources, services, etc. may be provided to user device 210 and/or organization analysis platform 250. Cloud computing environment 260 may provide computation, software, data access, storage, and/or other services that do not require end-user knowledge of a physical location and configuration of a system and/or a device that delivers the services. As shown, cloud computing environment 260 may include organization analysis platform 250 and computing resource 265.

Computing resource 265 includes one or more personal computers, workstation computers, server devices, or another type of computation and/or communication device. In some implementations, computing resource 265 may host organization analysis platform 250. The cloud resources may include compute instances executing in computing resource 265, storage devices provided in computing resource 265, data transfer devices provided by computing resource 265, etc. In some implementations, computing resource 265 may communicate with other computing resources 265 via wired connections, wireless connections, or a combination of wired and wireless connections.

As further shown in FIG. 2, computing resource 265 may include a group of cloud resources, such as one or more applications ("APPs") 265-1, one or more virtual machines ("VMs") 265-2, virtualized storage ("VSs") 265-3, one or more hypervisors ("HYPs") 265-4, or the like.

Application 265-1 includes one or more software applications that may be provided to or accessed by user device 210 and/or organization analysis platform 250. Application 265-1 may eliminate a need to install and execute the software applications on user device 210 and/or organization analysis platform 250. For example, application 265-1 may include software associated with organization analysis platform 250 and/or any other software capable of being provided via cloud computing environment 260. In some implementations, one application 265-1 may send/receive information to/from one or more other applications 265-1, via virtual machine 265-2.

Virtual machine 265-2 includes a software implementation of a machine (e.g., a computer) that executes programs like a physical machine. Virtual machine 265-2 may be either a system virtual machine or a process virtual machine, depending upon use and degree of correspondence to any real machine by virtual machine 265-2. A system virtual machine may provide a complete system platform that supports execution of a complete operating system ("OS"). A process virtual machine may execute a single program and may support a single process. In some implementations, virtual machine 265-2 may execute on behalf of a user (e.g., user device 210), and may manage infrastructure of cloud computing environment 260, such as data management, synchronization, or long-duration data transfers.

Virtualized storage 265-3 includes one or more storage systems and/or one or more devices that use virtualization techniques within the storage systems or devices of computing resource 265. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 265-4 provides hardware virtualization techniques that allow multiple operating systems (e.g., "guest operating systems") to execute concurrently on a host computer, such as computing resource 265. Hypervisor 265-4 may present a virtual operating platform to the guest operating systems and may manage the execution of the guest operating systems. Multiple instances of a variety of operating systems may share virtualized hardware resources.

Network 270 includes one or more wired and/or wireless networks. For example, network 270 may include a cellular network (e.g., a long-term evolution (LTE) network, a code division multiple access (CDMA) network, a 3G network, a 4G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
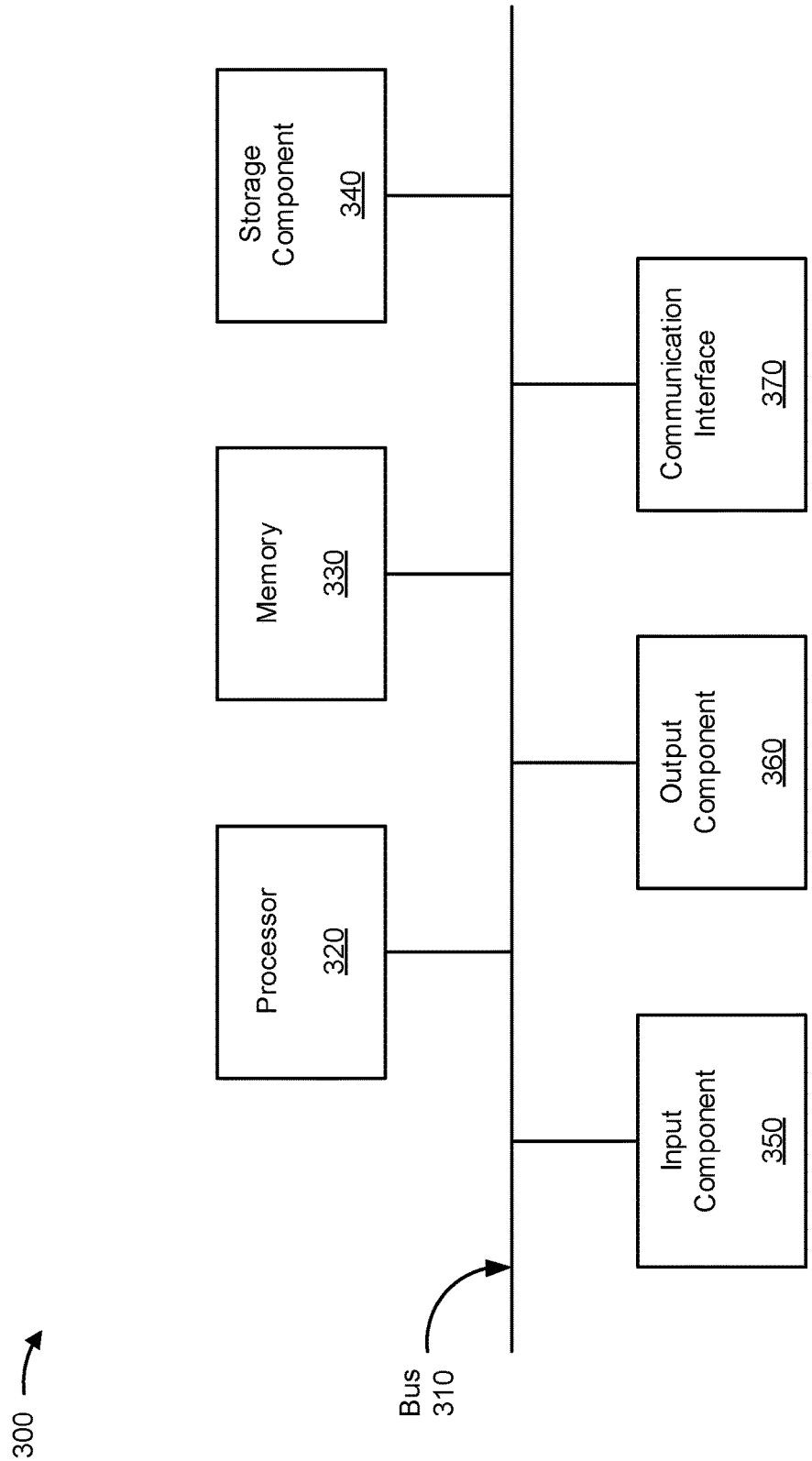
FIG. 3 is a diagram of example components of one or more devices of FIG. 2.

FIG. 3 is a diagram of example components of a device 300. Device 300 may correspond to user device 210, organization data aggregator 220, organization data storage device 225, workforce psychology data aggregator 230, workforce psychology data storage device 235, industry trend data aggregator 240, industry trend data storage device 245, organization analysis platform 250, and/or computing resource 265. In some implementations, user device 210, organization data aggregator 220, organization data storage device 225, workforce psychology data aggregator 230, workforce psychology data storage device 235, industry trend data aggregator 240, industry trend data storage device 245, organization analysis platform 250, and/or computing resource 265 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes based on to processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
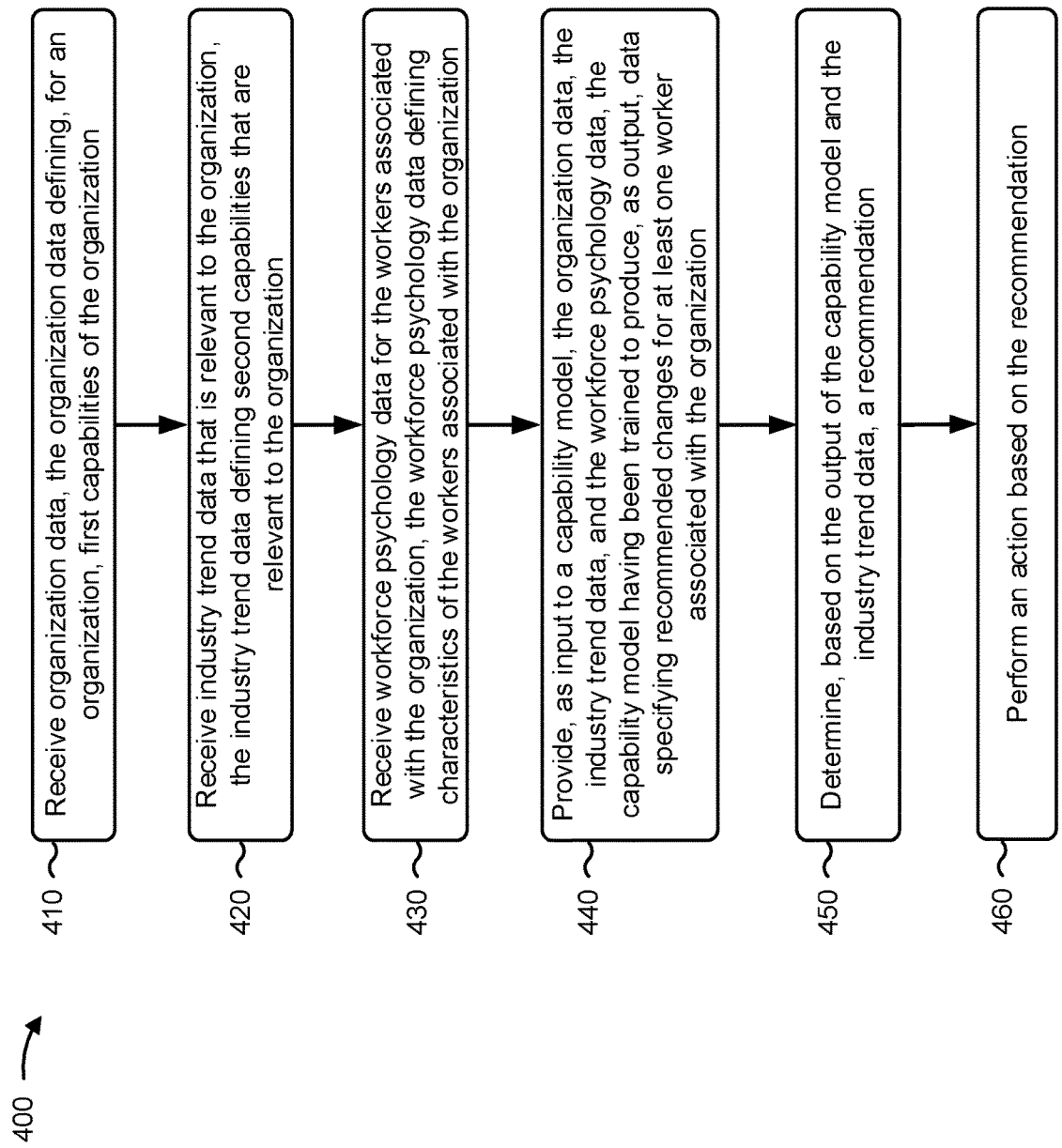
FIGS. 4-6 are flow charts of example processes for performing organizational analysis for workforce recommendations.

FIG. 4 is a flow chart of an example process 400 for performing organizational analysis for workforce recommendations. In some implementations, one or more process blocks of FIG. 4 may be performed by an organization analysis platform (e.g., organization analysis platform 250). In some implementations, one or more process blocks of FIG. 4 may be performed by another device or a group of devices separate from or including the organization analysis platform, such as an organization data aggregator (e.g. organization data aggregator 220), a workforce psychology data aggregator (e.g., workforce psychology data aggregator 230), industry trend data aggregator (e.g., industry trend data aggregator 240), and/or a computing resource (e.g. computing resource 265).

As shown in FIG. 4, process 400 may include receiving organization data, the organization data defining, for an organization, first capabilities of the organization (block 410). For example, the organization analysis platform (e.g., using computing resource 265, processor 320, memory 330, storage component 340, input component 350, communications interface 370, and/or the like) may receive organization data, the organization data defining, for an organization, first capabilities of the organization, as described above in connection with FIGS. 1A-1D. In some implementations, the first capabilities include: hardware, software, and/or services capabilities associated with the organization, and skills associated with workers associated with the organization.

As further shown in FIG. 4, process 400 may include receiving industry trend data that is relevant to the organization, the industry trend data defining second capabilities that are relevant to the organization (block 420). For example, the organization analysis platform (e.g., using computing resource 265, processor 320, memory 330, storage component 340, input component 350, communications interface 370, and/or the like) may receive industry trend data that is relevant to the organization, the industry trend data defining second capabilities that are relevant to the organization, as described above in connection with FIGS. 1A-1D. In some implementations, the second capabilities include: hardware, software, and/or services capabilities that are associated with at least one other organization, and skills associated with workers associated with the at least one other organization.

As further shown in FIG. 4, process 400 may include receiving workforce psychology data for the workers associated with the organization, the workforce psychology data defining characteristics of the workers associated with the organization (block 430). For example, the organization analysis platform (e.g., using computing resource 265, processor 320, memory 330, storage component 340, input component 350, communications interface 370, and/or the like) may receive workforce psychology data for the workers associated with the organization, the workforce psychology data defining characteristics of the workers associated with the organization, as described above in connection with FIGS. 1A-1D.

As further shown in FIG. 4, process 400 may include providing, as input to a capability model, the organization data, the industry trend data, and the workforce psychology data, the capability model having been trained to produce, as output, data specifying recommended changes for at least one worker associated with the organization (block 440). For example, the organization analysis platform (e.g., using computing resource 265, processor 320, memory 330, storage component 340, output component 360, communications interface 370, and/or the like) may provide, as input to a capability model, the organization data, the industry trend data, and the workforce psychology data, the capability model having been trained to produce, as output, data specifying recommended changes for at least one worker associated with the organization, as described above in connection with FIGS. 1A-1D.

As further shown in FIG. 4, process 400 may include determining, based on the output of the capability model and the industry trend data, a recommendation (block 450). For example, the organization analysis platform (e.g., using computing resource 265, processor 320, memory 330, storage component 340, and/or the like) may determine, based on the output of the capability model and the industry trend data, a recommendation, as described above in connection with FIGS. 1A-1D.

As further shown in FIG. 4, process 400 may include performing an action based on the recommendation (block 460). For example, the organization analysis platform (e.g., using computing resource 265, processor 320, memory 330, storage component 340, input component 350, output component 360, communications interface 370, and/or the like) may perform an action based on the recommendation, as described above in connection with FIGS. 1A-1D.

Process 400 may include additional implementations, such as any single implementation or any combination of implementations described below and/or in connection with one or more other processes described elsewhere herein.

In some implementations, process 400 may include clustering the organization data based on the workforce psychology data.

In some implementations, process 400 may include formatting the organization data into a predetermined format for the capability model, formatting the industry trend data into the predetermined format for the capability model, and formatting the organization data into the predetermined format for the capability model.

In some implementations, performing an action may include providing, to a user device, recommendation data, the recommendation data specifying the recommended changes and the recommendation for acquiring the at least one of the second capabilities.

In some implementations, the industry trend data may include data defining capabilities associated with a particular organization, the particular organization is different from the organization, and at least one capability of the capabilities associated with the particular organization is different from each capability included in the first capabilities. In some implementations, the organization data may be received from at least one third party organization data provider.

In some implementations, the workforce psychology data may include at least one of: psychology data derived from at least one interview performed by the organization, psychology data derived from at least one survey conducted by the organization, or psychology data provided by a third party psychological data provider, and the workforce psychology data indicates a measure of likelihood that a worker, of the at least one worker associated with the organization, can be re-trained to provide a particular capability of the second capabilities.

In some implementations, the capability model may produce, as output, data indicating a measure of importance associated with the recommended changes. Determining the recommendation for acquiring the at least one of the second capabilities may include determining the recommendation for acquiring the at least one of the second capabilities based on the measure of importance associated with the recommended changes.

In some implementations, the industry trend data may be received from a plurality of different data sources. In some implementations, process 400 may include comparing first industry trend data received from a first data source to second industry trend data received from a second data source to create benchmark data. In some implementations, the benchmark data may be provided as input to the capability model.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
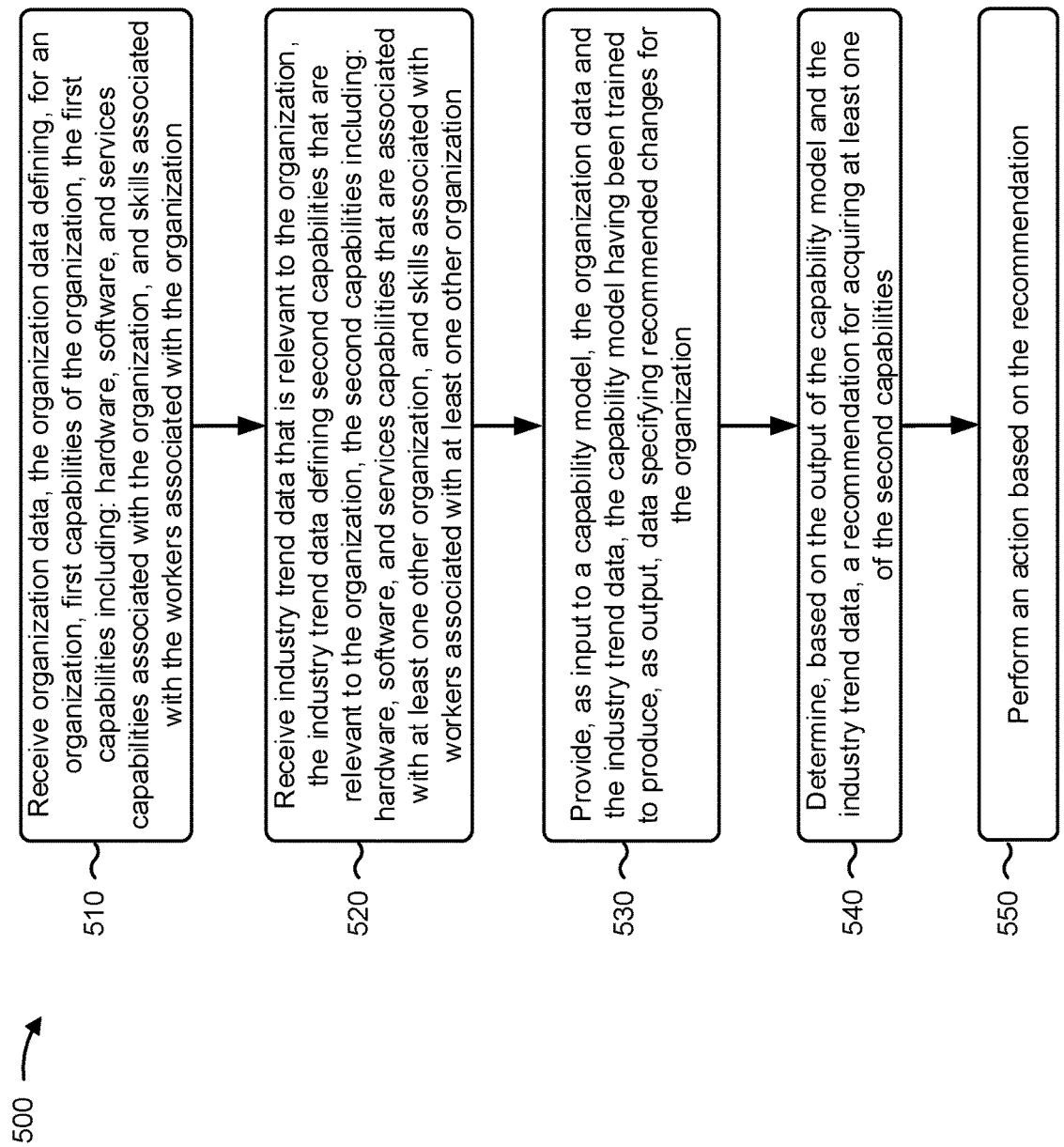

FIG. 5 is a flow chart of an example process 500 for performing organizational analysis for workforce recommendations. In some implementations, one or more process blocks of FIG. 5 may be performed by an organization analysis platform (e.g., organization analysis platform 250). In some implementations, one or more process blocks of FIG. 5 may be performed by another device or a group of devices separate from or including the organization analysis platform, such as an organization data aggregator (e.g. organization data aggregator 220), a workforce psychology data aggregator (e.g., workforce psychology data aggregator 230), industry trend data aggregator (e.g., industry trend data aggregator 240), and/or a computing resource (e.g. computing resource 265).

As shown in FIG. 5, process 500 may include receiving organization data, the organization data defining, for an organization, first capabilities of the organization, the first capabilities including: hardware, software, and services capabilities associated with the organization, and skills associated with workers associated with the organization (block 510). For example, the organization analysis platform (e.g., using computing resource 265, processor 320, memory 330, storage component 340, input component 350, communications interface 370, and/or the like) may receive organization data, the organization data defining, for an organization, first capabilities of the organization, the first capabilities including: hardware, software, and services capabilities associated with the organization, and skills associated with workers associated with the organization, as described above in connection with FIGS. 1A-1D.

As further shown in FIG. 5, process 500 may include receiving industry trend data that is relevant to the organization, the industry trend data defining second capabilities that are relevant to the organization, the second capabilities including: hardware, software, and services capabilities that are associated with at least one other organization, and skills associated with workers associated with the at least one other organization (block 520). For example, the organization analysis platform (e.g., using computing resource 265, processor 320, memory 330, storage component 340, input component 350, communications interface 370, and/or the like) may receive industry trend data that is relevant to the organization, the industry trend data defining second capabilities that are relevant to the organization the second capabilities including: hardware, software, and services capabilities that are associated with at least one other organization, and skills associated with workers associated with the at least one other organization, as described above in connection with FIGS. 1A-1D.

As further shown in FIG. 5, process 500 may include providing, as input to a capability model, the organization data and the industry trend data, and the workforce psychology data, the capability model having been trained to produce, as output, data specifying recommended changes for the organization (block 530). For example, the organization analysis platform (e.g., using computing resource 265, processor 320, memory 330, storage component 340, output component 360, communications interface 370, and/or the like) may provide, as input to a capability model, the organization data and the industry trend data, and the workforce psychology data, the capability model having been trained to produce, as output, data specifying recommended changes for the organization, as described above in connection with FIGS. 1A-1D.

As further shown in FIG. 5, process 500 may include determining, based on the output of the capability model and the industry trend data, a recommendation for acquiring at least one of the second capabilities (block 540). For example, the organization analysis platform (e.g., using computing resource 265, processor 320, memory 330, storage component 340, and/or the like) may determine, based on the output of the capability model and the industry trend data, a recommendation for acquiring at least one of the second capabilities, as described above in connection with FIGS. 1A-1D.

As further shown in FIG. 5, process 500 may include performing an action based on the recommendation (block 550). For example, the organization analysis platform (e.g., using computing resource 265, processor 320, memory 330, storage component 340, input component 350, output component 360, communications interface 370, and/or the like) may perform an action based on the recommendation, as described above in connection with FIGS. 1A-1D.

Process 500 may include additional implementations, such as any single implementation or any combination of implementations described below and/or in connection with one or more other processes described elsewhere herein.

In some implementations, performing the action may include identifying, based on worker data provided on a third party website, a target worker associated with the at least one of the second capabilities; and providing a user device with data identifying the target worker.

In some implementations, performing the action may include identifying a contractor associated with the at least one of the second capabilities, and providing data that causes the contractor to provide the at least one of the second capabilities for the organization.

In some implementations, performing the action may include identifying a new equipment, a new software, or a new service associated with the at least one of the second capabilities; and ordering the new equipment, the new software, or the new service.

In some implementations, process 500 may include generating a profile for a new worker associated with the at least one of the second capabilities, and providing the profile to a user device.

In some implementations, process 500 may include generating a job advertisement based on the at least one of the second capabilities, and providing data that causes the job advertisement to be posted on a job website.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
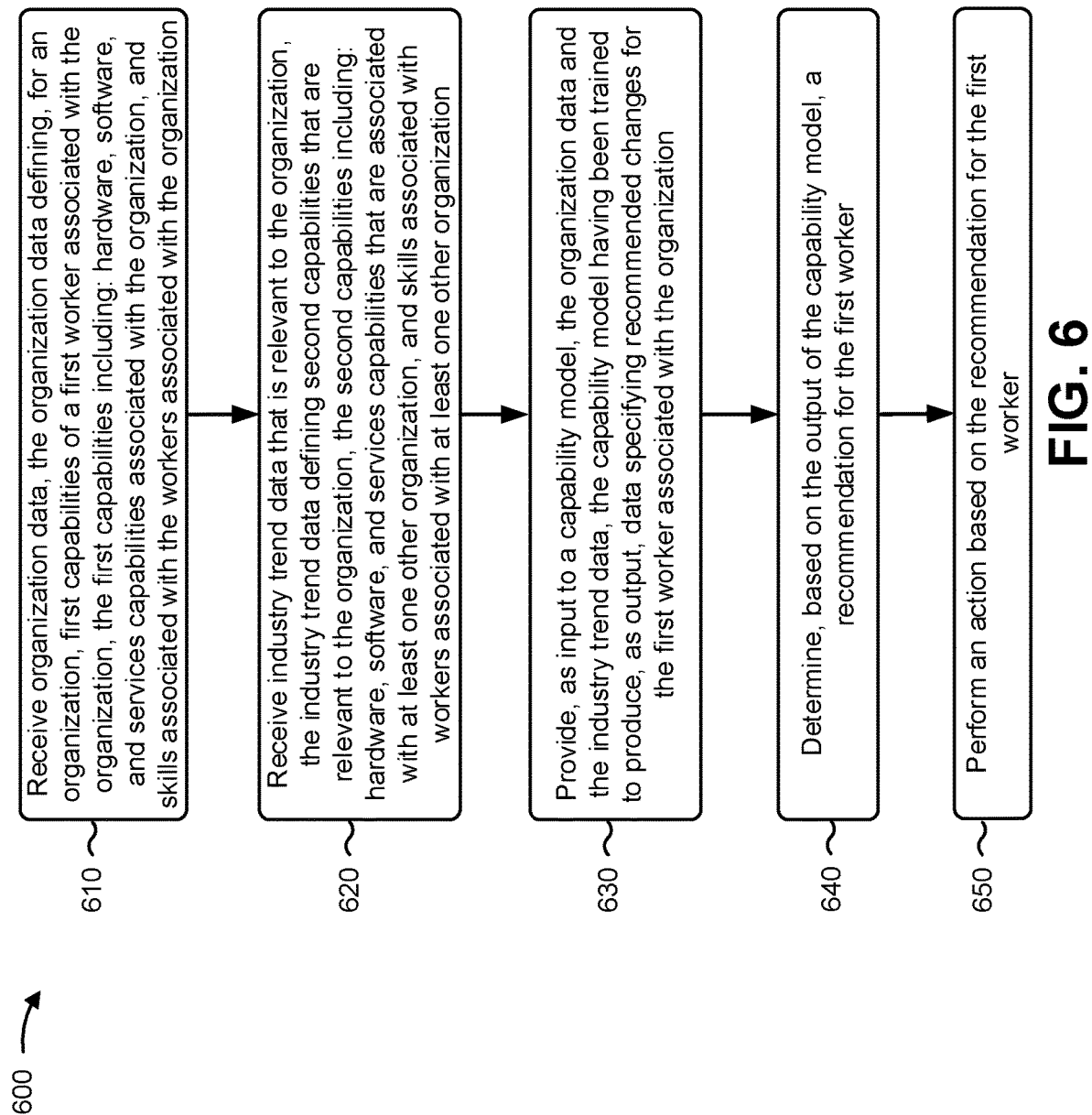

FIG. 6 is a flow chart of an example process 600 for performing organizational analysis for workforce recommendations. In some implementations, one or more process blocks of FIG. 6 may be performed by an organization analysis platform (e.g., organization analysis platform 250). In some implementations, one or more process blocks of FIG. 6 may be performed by another device or a group of devices separate from or including the organization analysis platform, such as an organization data aggregator (e.g. organization data aggregator 220), a workforce psychology data aggregator (e.g., workforce psychology data aggregator 230), industry trend data aggregator (e.g., industry trend data aggregator 240), and/or a computing resource (e.g. computing resource 265).

As shown in FIG. 6, process 600 may include receiving organization data, the organization data defining, for an organization, first capabilities of a first worker associated with the organization, the first capabilities including: hardware, software, and services capabilities associated with the organization, and skills associated with workers associated with the organization (block 610). For example, the organization analysis platform (e.g., using computing resource 265, processor 320, memory 330, storage component 340, input component 350, communications interface 370, and/or the like) may receive the organization data defining, for an organization, first capabilities of a first worker associated with the organization, the first capabilities including: hardware, software, and services capabilities associated with the organization, and skills associated with workers associated with the organization, as described above in connection with FIGS. 1A-1D.

As further shown in FIG. 6, process 600 may include receiving industry trend data that is relevant to the organization, the industry trend data defining second capabilities that are relevant to the organization, the second capabilities including: hardware, software, and services capabilities that are associated with at least one other organization, and skills associated with workers associated with the at least one other organization (block 620). For example, the organization analysis platform (e.g., using computing resource 265, processor 320, memory 330, storage component 340, input component 350, communications interface 370, and/or the like) may receive industry trend data that is relevant to the organization, the industry trend data defining second capabilities that are relevant to the organization the second capabilities including: hardware, software, and services capabilities that are associated with at least one other organization, and skills associated with workers associated with the at least one other organization, as described above in connection with FIGS. 1A-1D.

As further shown in FIG. 6, process 600 may include providing, as input to a capability model, the organization data and the industry trend data, and the workforce psychology data, the capability model having been trained to produce, as output, data specifying recommended changes for the first worker associated with the organization (block 630). For example, the organization analysis platform (e.g., using computing resource 265, processor 320, memory 330, storage component 340, output component 360, communications interface 370, and/or the like) may provide, as input to a capability model, the organization data and the industry trend data, and the workforce psychology data, the capability model having been trained to produce, as output, data specifying recommended changes for the first worker associated with the organization, as described above in connection with FIGS. 1A-1D.

As further shown in FIG. 6, process 600 may include determining, based on the output of the capability model and the industry trend data, a recommendation for the first worker (block 640). For example, the organization analysis platform (e.g., using computing resource 265, processor 320, memory 330, storage component 340, and/or the like) may determine, based on the output of the capability model and the industry trend data, a recommendation for the first worker, as described above in connection with FIGS. 1A-1D.

As further shown in FIG. 6, process 600 may include performing an action based on the recommendation for the first worker (block 650). For example, the organization analysis platform (e.g., using computing resource 265, processor 320, memory 330, storage component 340, input component 350, output component 360, communications interface 370, and/or the like) may perform an action based on the recommendation for the first worker, as described above in connection with FIGS. 1A-1D.

Process 600 may include additional implementations, such as any single implementation or any combination of implementations described below and/or in connection with one or more other processes described elsewhere herein.

In some implementations, the first worker may be associated with a set of capabilities which are not included in the second capabilities. In some implementations, performing an action may include identifying worker contact information associated with the first worker, and providing the first worker with data identifying re-training courses for the first worker.

In some implementations, performing an action may include identifying a second worker that manages the first worker and providing, to a user device associated with the second worker, data indicating that the first worker should be released from the organization.

In some implementations, performing an action may include identifying a second worker that manages the first worker and providing, to a user device associated with the second worker, data indicating the recommendation for the first worker.

In some implementations, determining the recommendation for the first worker may include determining the recommendation for the first worker based on organization preferences associated with the organization, the organization preferences indicating a threshold measure of likelihood that the first worker can be re-trained to acquire at least one of the second capabilities.

In some implementations, determining the recommendation for the first worker may include determining the recommendation for the first worker based on workforce psychology data associated with the first worker, the workforce psychology data indicating, for the first worker, a measure of likelihood that the first worker will be receptive to re-training associated with at least one of the second capabilities.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

Using processes similar to those described above, an organization analysis platform 250 may facilitate the improvement of an organization in a manner designed to utilize the organization's current workforce to the extent possible and recommend changes to the organization's workforce that will align the organization with desired industry trends (e.g., in a manner designed to increase the efficiency and/or improve the operations of the organization). In some implementations, the organization analysis platform 250 may recommend particular changes associated with particular individuals (e.g., recommendations to hire a particular worker, re-train another worker, and/or the like). Workforce recommendations may significantly increase the speed and efficiency of an organization and the organization's workforce transformation, including facilitating more efficient use of information regarding workers associated with the organization. Furthermore, some implementations described herein use a rigorous, computerized process to perform tasks or roles that were not previously performed. Also, automating the process for recommending workforce changes conserves computing resources (e.g., processor resources, memory resources, and/or the like) and time that would otherwise be wasted by using manual processes for attempting to identify desired workforce capabilities and determining how to implement workforce changes in a manner designed to achieve the desired workforce capabilities.

The foregoing disclosure provides illustration and description, but is not intended to be exhaustive or to limit the implementations to the precise form disclosed. Modifications and variations are possible in light of the above disclosure or may be acquired from practice of the implementations.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, or the like.

Some implementations described herein store or otherwise handle personal information (e.g., personal identifying information, or PII) associated with individuals. In some implementations, individuals may choose to opt-in or opt-out of the use of personal information. In some implementations, personal information may be stored in a secure manner, e.g., using data encryption techniques and identifiers that are unique to the implementations described herein.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
receiving, by a computing resource of a cloud computing environment, organization data,
the organization data defining, for an organization, first capabilities of the organization,
the first capabilities including:
hardware, software, and/or services capabilities associated with the organization, and/or
skills associated with workers associated with the organization;
pre-processing, by a computing resource of the cloud computing environment, the organization data to create pre-processed organization data by:
performing natural language processing on the organization data to identify at least one of entities, categories, sentiments, or labels associated with the first capabilities,
normalizing the organization data, and
formatting the organization data into a machine recognizable format;
performing, by a computing resource of the cloud computing environment and based on pre-processing the organization data, data cleansing on the pre-processed organization data to:
detect corrupt or inaccurate data in the pre-processed organization data, and
replace, modify, or delete the corrupt or inaccurate data;
identifying, by a computing resource of the cloud computing environment, based on the data cleansing of the pre-processed organization data, and based on at least one of the entities, the categories, the sentiments, or the labels, a historical association between at least one of the first capabilities and one or more additional capabilities,
the one or more additional capabilities being different from the first capabilities;
performing, by a computing resource of the cloud computing environment and based on identifying the one or more additional capabilities, a data enrichment process on the pre-processed organization data to enrich the pre-processed organization data by adding the one or more additional capabilities to the first capabilities to create enriched capabilities;
receiving, by a computing resource of the cloud computing environment, industry trend data that is relevant to the organization,
the industry trend data defining second capabilities that are relevant to the organization,
the second capabilities including:
hardware, software, and/or services capabilities that are associated with at least one other organization, and/or
skills associated with workers associated with the at least one other organization;
comparing, by a computing resource of the cloud computing environment and using the industry trend data, first industry trend data received from a first data source to second industry trend data received from a second data source to create benchmark data;
receiving, by a computing resource of the cloud computing environment, workforce psychology information for the workers associated with the organization;
generating, by a computing resource of the cloud computing environment, workforce psychology data by mapping at least a portion of the workforce psychology information to predetermined worker characteristics,
the workforce psychology data defining the predetermined worker characteristics of the workers associated with the organization;
clustering, by a computing resource of the cloud computing environment, after performing the data cleansing on the pre-processed organization data, and based on the enriched capabilities and the workforce psychology data, the workers associated with the organization to generate clustered organization data;
providing, by a computing resource of the cloud computing environment and as input to a capability model, the clustered organization data, the benchmark data, and the industry trend data,
the capability model comprising a machine learning model that has been trained to produce, as output, data specifying recommended changes for at least one worker associated with the organization;
determining, by a computing resource of the cloud computing environment and based on the output of the capability model, a recommendation; and
performing, by a computing resource of the cloud computing environment and based on the recommendation, an action associated with the recommendation,
wherein performing the action associated with the recommendation comprises providing, to a user device, information to notify an individual or other entity that the computing resource of the cloud computing environment has taken or is about to take action based on the recommendation.

2. The method of claim 1, further comprising:
formatting the clustered organization data into a predetermined format for the capability model; and
formatting the industry trend data into the predetermined format for the capability model.

3. The method of claim 1, wherein performing the action comprises:
providing, to the user device, recommendation data,
the recommendation data specifying the recommended changes and the recommendation for acquiring the at least one of the second capabilities.

4. The method of claim 1, wherein the industry trend data includes data defining capabilities associated with a particular organization, the particular organization being different from the organization, and at least one capability of the capabilities associated with the particular organization is different from each capability included in the first capabilities.

5. The method of claim 1, wherein the industry trend data is received from a plurality of different data sources.

6. The method of claim 1, wherein:
the workforce psychology data includes at least one of:
psychology data derived from at least one interview performed by the organization,
psychology data derived from at least one survey conducted by the organization, or
psychology data provided by a third party psychological data provider, and the workforce psychology data indicates a measure of likelihood that a worker, of the at least one worker associated with the organization, can be re-trained to provide a particular capability of the second capabilities.

7. The method of claim 1, wherein the capability model produces, as output, data indicating a measure of importance associated with the recommended changes; and
wherein determining the recommendation comprises:
determining the recommendation for acquiring at least one of the second capabilities based on the measure of importance associated with the recommended changes.

8. A device comprising:
one or more memories; and
one or more processors, communicatively coupled to the one or more memories, to:
receive organization data,
the organization data defining, for an organization, first capabilities of the organization,
the first capabilities including:
hardware, software, and services capabilities associated with the organization, and
skills associated with workers associated with the organization;
pre-process the organization data to create pre-processed organization data, wherein the one or more processors, when pre-processing the organization data to create the pre-processed organization data, are to:
perform natural language processing on the organization data to identify at least one of entities, categories, sentiments, or labels associated with the first capabilities,
normalize the organization data, and
format the organization data into a machine recognizable format;
perform, based on pre-processing the organization data, data cleansing on the pre-processed organization data to:
detect corrupt or inaccurate data in the pre-processed organization data, and
replace, modify, or delete the corrupt or inaccurate data;
identify, based on the data cleansing of the pre-processed organization data, and based on at least one of the entities, the categories, the sentiments, or the labels, a historical association between at least one of the first capabilities and one or more additional capabilities,
the one or more additional capabilities being different from the first capabilities;
perform, based on identifying the one or more additional capabilities, a data enrichment process on the pre-processed organization data to enrich the pre-processed organization data by adding the one or more additional capabilities to the first capabilities to create enriched capabilities;
receive industry trend data that is relevant to the organization,
the industry trend data defining second capabilities that are relevant to the organization,
the second capabilities including:
hardware, software, and services capabilities that are associated with at least one other organization, and
skills associated with workers associated with the at least one other organization;
compare, using the industry trend data, first industry trend data received from a first data source to second industry trend data received from a second data source to create benchmark data;
receive workforce psychology information for the workers associated with the organization;
generate workforce psychology data by mapping at least a portion of the workforce psychology information to predetermined worker characteristics,
the workforce psychology data defining the predetermined worker characteristics of the workers associated with the organization;
cluster, after performing the data cleansing on the pre-processed organization data and based on the enriched capabilities and the workforce psychology data, the workers associated with the organization to generate clustered organization data;
provide, as input to a capability model, the clustered organization data, the benchmark data, and the industry trend data,
the capability model comprising a machine learning model that has been trained to produce, as output, data specifying recommended changes for the organization;
determine, based on the output of the capability model and the industry trend data, a recommendation for acquiring at least one of the second capabilities; and
perform, based on the recommendation, an action associated with the recommendation,
wherein, to perform the action associated with the recommendation, the one or more processors are configured to provide, to a user device, information to notify an individual or other entity that a computing resource of a cloud computing environment has taken or is about to take action based on the recommendation.

9. The device of claim 8, wherein the one or more processors, that perform the action based on the recommendation, are to:
identify, based on worker data provided on a third party website, a target worker associated with the at least one of the second capabilities; and
provide the user device with data identifying the target worker.

10. The device of claim 8, wherein the one or more processors, that perform the action based on the recommendation, are to:
identify a contractor associated with the at least one of the second capabilities; and
provide data that causes the contractor to provide the at least one of the second capabilities for the organization.

11. The device of claim 8, wherein the one or more processors, that perform the action based on the recommendation, are to:
identify a new equipment, a new software, or a new service associated with the at least one of the second capabilities; and
order the new equipment, the new software, or the new service.

12. The device of claim 8, wherein the one or more processors are further to:
generate a profile for a new worker associated with the at least one of the second capabilities; and
provide the profile to a user device.

13. The device of claim 8, wherein the one or more processors are further to:
  generate a job advertisement based on the at least one of the second capabilities; and
  provide data that causes the job advertisement to be posted on a job website.

14. The device of claim 8, wherein the capability model produces, as output, data indicating a measure of importance associated with the recommended changes; and
  wherein the one or more processors, when determining the recommendation, are to:
    determine the recommendation for acquiring at least one of the second capabilities based on the measure of importance associated with the recommended changes.

15. A non-transitory computer-readable medium storing instructions, the instructions comprising:
  one or more instructions that, when executed by one or more processors, cause the one or more processors to:
    receive organization data,
      the organization data defining, for an organization, first capabilities of a first worker associated with the organization,
        the first capabilities including:
          hardware, software, and services capabilities associated with the organization, and
          skills associated with the first worker associated with the organization;
    pre-process the organization data to create pre-processed organization data, wherein the one or more instructions, that cause the one or more processors to pre-process the organization data to create the pre-processed organization data, cause the one or more processors to:
      perform natural language processing on the organization data to identify at least one of entities, categories, sentiments, or labels associated with the first capabilities,
      normalize the organization data, and
      format the organization data into a machine recognizable format;
    perform, based on pre-processing the organization data, data cleansing on the pre-processed organization data to:
      detect corrupt or inaccurate data in the pre-processed organization data, and
      replace, modify, or delete the corrupt or inaccurate data;
    identify, based on the data cleansing of the pre-processed organization data, and based on at least one of the entities, the categories, the sentiments, or the labels, a historical association between at least one of the first capabilities and one or more additional capabilities,
      the one or more additional capabilities being different from the first capabilities;
    perform, based on identifying the one or more additional capabilities, a data enrichment process on the pre-processed organization data to enrich the pre-processed organization data by adding the one or more additional capabilities to the first capabilities to create enriched capabilities;
    receive industry trend data that is relevant to the organization,
      the industry trend data defining second capabilities that are relevant to the organization,
        the second capabilities including:
          hardware, software, and services capabilities that are associated with at least one other organization, and
          skills associated with workers associated with the at least one other organization;
    compare, using the industry trend data, first industry trend data received from a first data source to second industry trend data received from a second data source to create benchmark data;
    receive workforce psychology information for the first worker associated with the organization;
    generate workforce psychology data by mapping at least a portion of the workforce psychology information to predetermined worker characteristics,
      the workforce psychology data defining the predetermined worker characteristics of the first worker associated with the organization;
    cluster, after performing the data cleansing on the pre-processed organization data and based on the enriched capabilities and the workforce psychology data, the workers associated with the organization to generate clustered organization data;
    provide, as input to a capability model, the clustered organization data, the benchmark data, and the industry trend data,
      the capability model comprising a machine learning model that has been trained to produce, as output, data specifying recommended changes for the first worker associated with the organization;
    determine, based on the output of the capability model, a recommendation for the first worker; and
    perform an action, associated with the recommendation, based on the recommendation for the first worker,
      wherein the one or more instructions, that cause the one or more processors to perform the action associated with the recommendation, cause the one or more processors to provide, to a user device, information to notify an individual or other entity that a computing resource of a cloud computing environment has taken or is about to take action based on the recommendation.

16. The non-transitory computer-readable medium of claim 15, wherein the first worker is associated with a set of capabilities which are not included in the second capabilities.

17. The non-transitory computer-readable medium of claim 15, wherein the one or more instructions, that cause the one or more processors to perform the action based on the recommendation for the first worker, cause the one or more processors to:
  identify worker contact information associated with the first worker; and
  provide the first worker with data identifying re-training courses for the first worker.

18. The non-transitory computer-readable medium of claim 15, wherein the one or more instructions, that cause the one or more processors to determine the recommendation for the first worker, cause the one or more processors to:
  determine the recommendation for the first worker based on organization preferences associated with the organization,
    the organization preferences indicating a threshold measure of likelihood that the first worker can be re-trained to acquire at least one of the second capabilities.

19. The non-transitory computer-readable medium of claim 15, wherein the one or more instructions, that cause the one or more processors to determine the recommendation for the first worker, cause the one or more processors to:
    determine the recommendation for the first worker based on a portion of the workforce psychology data associated with the first worker,
        the portion of the workforce psychology data indicating, for the first worker, a measure of likelihood that the first worker will be receptive to re-training associated with at least one of the second capabilities.

20. The non-transitory computer-readable medium of claim 15, wherein the capability model produces, as output, data indicating a measure of importance associated with the recommended changes; and
    wherein the one or more instructions, that cause the one or more processors to determine the recommendation, cause the one or more processors to:
    determine the recommendation for acquiring at least one of the second capabilities based on the measure of importance associated with the recommended changes.

\* \* \* \* \*